US011843247B2

(12) United States Patent
Ginart et al.

(10) Patent No.: US 11,843,247 B2
(45) Date of Patent: Dec. 12, 2023

(54) MODULAR TIME SYNCHRONIZED INJECTION MODULES

(71) Applicant: Smart Wires Inc., Union City, CA (US)

(72) Inventors: Antonio Ginart, Santa Clarita, CA (US); Michael T. Garrison Stuber, Newman Lake, WA (US); Haroon Inam, San Jose, CA (US); Shreesha Adiga Manoor, Milpitas, CA (US)

(73) Assignee: Smart Wires Inc., Durham, NC (US)

( * ) Notice: Subject to any disclaimer, the term of this patent is extended or adjusted under 35 U.S.C. 154(b) by 74 days.

(21) Appl. No.: 17/445,802

(22) Filed: Aug. 24, 2021

(65) Prior Publication Data

US 2021/0384727 A1    Dec. 9, 2021

Related U.S. Application Data

(63) Continuation of application No. 16/398,064, filed on Apr. 29, 2019, now Pat. No. 11,121,551.
(Continued)

(51) Int. Cl.
    *H02J 13/00* (2006.01)
    *G05B 13/02* (2006.01)
    (Continued)

(52) U.S. Cl.
    CPC .... *H02J 13/00034* (2020.01); *G05B 13/0255* (2013.01); *H02J 3/00* (2013.01);
    (Continued)

(58) Field of Classification Search
    CPC .... H02J 3/06; H02J 3/00; H02J 3/1835; H02J 3/24; H02J 13/0006; H02J 3/242;
    (Continued)

(56) References Cited

U.S. PATENT DOCUMENTS

| 4,992,920 A | 2/1991 | Davis |
| 5,198,746 A * | 3/1993 | Gyugyi ................ H02J 3/1814 363/39 |

(Continued)

FOREIGN PATENT DOCUMENTS

| EP | 3334001 | 6/2018 |
| WO | 96/19025 | 6/1996 |

(Continued)

OTHER PUBLICATIONS

D. Yang, X. Ruan and H. Wu, "Impedance Shaping of the Grid-Connected Inverter with LCL Filter to Improve Its Adaptability to the Weak Grid Condition," in IEEE Transactions on Power Electronics, vol. 29, No. 11, pp. 5795-5805, Nov. 2014, [retrieved from online Dec. 2022] (Year: 2014).*

(Continued)

*Primary Examiner* — Kenneth M Lo
*Assistant Examiner* — Mohammed Shafayet
(74) *Attorney, Agent, or Firm* — Womble Bond Dickinson (US) LLP

(57) ABSTRACT

In prior art grid systems, power-line control is done by substation based large systems that use high-voltage (HV) circuits to get injectable impedance waveforms that can create oscillations on the HV power lines. Intelligent impedance injection modules (IIMs) are currently being proposed for interactive power line control and line balancing. These IIMs distributed over the high-voltage lines or installed on mobile platforms and connected to the HV power lines locally generate and inject waveforms in an intelligent fashion to provide interactive response capability to commands from utility for power line control. These IIMs typically comprise a plurality of impedance-injection units (IIUs) that are transformer-less flexible alternating current transmission systems interconnected in a series-parallel con-
(Continued)

nection and output pulses that are additive and time synchronized to generate appropriate waveforms that when injected into HV transmission lines are able to accomplish the desired response and provide interactive power flow control.

25 Claims, 18 Drawing Sheets

Related U.S. Application Data

(60) Provisional application No. 62/721,749, filed on Aug. 23, 2018.

(51) Int. Cl.
  *H02J 3/18* (2006.01)
  *H02J 3/00* (2006.01)
  *H02J 3/20* (2006.01)
  *H02J 3/06* (2006.01)
  *H02J 3/24* (2006.01)

(52) U.S. Cl.
  CPC .......... *H02J 3/1814* (2013.01); *H02J 3/1835* (2013.01); *H02J 3/20* (2013.01); *H02J 13/00004* (2020.01); *H02J 13/00016* (2020.01); *H02J 3/06* (2013.01); *H02J 3/242* (2020.01)

(58) Field of Classification Search
  CPC ...... H02J 13/00034; H02J 3/1814; H02J 3/20; H02J 13/00004; H02J 13/00016; H02J 3/01; H02J 3/1807; H02J 3/26; G05B 13/0255; Y02E 40/10; Y02E 40/30; Y02E 40/70; Y02E 60/00; Y04S 10/22; Y04S 40/124; H04J 3/0617

See application file for complete search history.

(56) References Cited

U.S. PATENT DOCUMENTS

| | | | |
|---|---|---|---|
| 5,424,627 A * | 6/1995 | Clark | H02J 3/24 |
| | | | 323/210 |
| 10,097,037 B2 | 10/2018 | Inam et al. | |
| 11,121,551 B2 * | 9/2021 | Ginart | H02J 3/1814 |
| 2007/0164613 A1 | 7/2007 | Yamada et al. | |
| 2013/0157593 A1 * | 6/2013 | Achanta | H04J 3/0638 |
| | | | 455/84 |
| 2014/0032148 A1 * | 1/2014 | Verhulst | G01R 27/02 |
| | | | 702/65 |
| 2016/0134114 A1 | 5/2016 | Gupta et al. | |
| 2017/0052222 A1 | 2/2017 | Pasdar et al. | |
| 2017/0163245 A1 * | 6/2017 | Iyer | H02J 3/26 |
| 2017/0235286 A1 * | 8/2017 | Inam | H02J 13/00022 |
| | | | 700/295 |
| 2017/0237255 A1 * | 8/2017 | Inam | H02J 3/06 |
| | | | 700/295 |
| 2018/0138702 A1 * | 5/2018 | Inam | H02J 3/1814 |

FOREIGN PATENT DOCUMENTS

| | | |
|---|---|---|
| WO | 2006/131017 | 12/2006 |
| WO | 2017/008245 | 1/2017 |

OTHER PUBLICATIONS

Invitation Pursuant to Rule 62a(1)EPC Dated Nov. 28, 2019; European Patent Application No. 19191056.1 (2 pages total).
Extended European Search Report dated Mar. 26, 2020; European Patent Application No. 19191056.1 (12 pages total).

* cited by examiner

| | | | TABLE -1 | Time delay of injection by distributed BMs of Fig. 8 to generate a pseudo-sinusoidal wave |
|---|---|---|---|---|
| | | | | Time t0=t1a1 |
| | | | | dt(x) = time delay between injections needed to generate a pseudo-sinusoidal waveform |
| | | Start | Stop | |
| | | Injection by 300a | | |
| 1 | | t1a1 | | t0 |
| | | | t1a2 | t1a1+t(600-1a) |
| 2 | t1a1 | t2a1 | | dt1 |
| | | | t2a2 | t2a1+t(600-2a) |
| 3 | t1a1 | t3a1 | | dt1+dt2+t11 |
| | | | t3a2 | t3a1+t(600-a3) |
| 4 | t1a1 | t4a1 | | dt1+dt2+dt3+t11 |
| | | | t4a2 | t4a1+t(600-a4) |
| | | Injection by 300b | | |
| 5 | t1a1 | t1b1 | | dt1+dt2+dt3+dt4+t11+t21 |
| | | | t1b2 | t1b1+t(600-1b) |
| 6 | t1a1 | t2b1 | | dt1+dt2+dt3+dt4+dt5+t11+t21 |
| | | | t2b2 | t2b1+t(600-2b) |
| 7 | t1a1 | t3b1 | | dt1+dt2+dt3+dt4+dt5+dt6+(2*t11)+t21 |
| | | | t3b2 | t3b1+t(600-3b) |
| 8 | t1a1 | t4b1 | | dt1+dt2+dt3+dt4+dt5+dt6+dt7+(2*t11)+t21 |
| | | | t4b2 | t4b1+t(600_4b) |
| | | Injection by 300c | | |
| 9 | t1a1 | t1c1 | | dt1+dt2+dt3+dt4+dt5+dt6+dt7+dt8+(2*t11)+t21+t31 |
| | | | t1c2 | t1c1+t(600-1c) |
| 10 | t1a1 | t2c1 | | dt1+dt2+dt3+dt4+dt5+dt6+dt7+dt8+dt9+(2*t11)+t21+t31 |
| | | | t2c2 | t2c1+t(600-c2) |
| 11 | t1a1 | t3c1 | | dt1+dt2+dt3+dt4+dt5+dt6+dt7+dt8+dt9+dt10+(3*t11)+t21+t31 |
| | | | t3c2 | t3c1+t(600-c3) |
| 12 | t1a1 | t4c1 | | dt1+dt2+dt3+dt4+dt5+dt6+dt7+dt8+dt9+dt10+dt11+(3*t11)+t21+t31 |
| | | | t4c2 | t4c1+t(600-c4) |
| | | Injection by 300d | | |
| 13 | t1a1 | t1d1 | | dt1+dt2+dt3+dt4+dt5+dt6+dt7+dt8+dt9+dt10+dt11+dt12+(3*t11)+t21+t31+t22 |
| | | | t1d2 | t1d1+t(600-d1) |
| 14 | t1a1 | t2d1 | | dt1+dt2+dt3+dt4+dt5+dt6+dt7+dt8+dt9+dt10+dt11+dt12+dt13+(3*t11)+t21+t31+t22 |
| | | | t2d2 | t2d1+t(600-d2) |
| 15 | t1a1 | t3d1 | | dt1+dt2+dt3+dt4+dt5+dt6+dt7+dt8+dt9+dt10+dt11+dt12+dt13+dt14+(4*t11)+t21+t31+t22 |
| | | | t3d2 | t3d1+t(600-d3) |
| 16 | t1a1 | t4d1 | | dt1+dt2+dt3+dt4+dt5+dt6+dt7+dt8+dt9+dt10+dt11+dt12+dt13+dt14+dt15+(4*t11)+t21+t31+t22 |
| | | | t4d2 | t4d1+t(600-d4) |

Fig. 14

MODULAR TIME SYNCHRONIZED INJECTION MODULES

CROSS REFERENCE TO RELATED APPLICATIONS

This application is a continuation of U.S. patent application Ser. No. 16/398,064, filed on Apr. 29, 2019, which claims the benefit of U.S. Provisional Application No. 62/721,749 filed on Aug. 23, 2018, the disclosures of which are incorporated herein by reference.

TECHNICAL FIELD

The present disclosure relates to reducing the harmonic component of impedance injection for balancing and control of power flow on the grid by providing a pseudo-sinusoidal voltage, built up by synchronous injection from a plurality of distributed injection modules that is smoothed to a sine wave by the impedance of the high-voltage power line.

BACKGROUND

Most power utilities use an energy management system (EMS)/supervisory control and data acquisition (SCADA) control systems for control of the power grid systems. FIG. 2 shows such a power generation—distribution system 200 with the substation-based static synchronous series compensators (SSSCs) 204 connected to power lines 108 and controlled directly by utility 206 over communication lines 207 for line balancing. In these cases, both power generators 203 and loads 205 are also shown connected at the substations. These control systems provide connection and communication between the power flow control units at the substations 204 from where distribution loads 205 are also connected. These utility-controlled controlled systems are used to limit load imbalances over the power lines of the power transmission on the grid. As the systems are controlled by the utility 206 directly, they are slow to react to disturbances and imbalances on the grid. The systems as indicated are typically substation-based high power systems that are programmed to inject high voltages into the high-voltage (HV) transmission lines 108.

These line balancing systems generate and inject impedance as high power square waves, which will cause harmonic oscillations in the power grid since the voltages that are required to be generated and injected for line control by these ground-based units are high. Hence these systems are typically designed to generate pseudo-sine waves as shown in FIG. 2A by using high voltage switches that switch at high-speeds and high power to generate a series of square waves of varying amplitudes, that when smoothed, provide the sinusoidal wave for injection into the HV transmission lines 108. The use of the specialized power-hungry high voltage and high-speed switches, which require high reliability, transient blocking capability, high voltage insulation, and liquid cooling to remove the heat generated while switching, makes these substation-based units expensive to operate and maintain.

The current move in the industry is to use distributed and localized control in addition to utility based control of power flow over the HV transmission lines 108 using intelligent impedance injection modules (IIMs) that are coupled to the power line. FIG. 1 shows such an implementation. In FIG. 1, HV transmission lines 108 connected between generation points 104 and loads 106 are suspended from high voltage towers 110. The figure shows the IIMs 102 suspended on the power lines operating at the HV of the power lines. These IIMs with built-in intelligence are able to identify any local power flow control needs and any disturbance on the HV transmission line 108 and provide immediate and effective local corrective action by generating and injecting corrective impedance into the HV transmission line.

A more advanced example of system 200 is shown in FIG. 3, as system 200A that includes distributed impedance injection modules (IIMs) 300 distributed over HV transmission lines 108 between substations 204. The IIMs 300 are directly attached to the HV transmission lines 108 of the power grid that are suspended insulated from ground on HV towers 201. Generators 203 and loads 205 are typically connected to the HV transmission lines 108 of the power grid at the substations 204. The IIMs 300 are communicatively connected or coupled to local intelligence centers (LINCs) 302 via high-speed communication links 303 that allow for communication and reaction by the IIMs 300 in the local area at sub synchronous speeds when required. The LINCs 302 are also connected by high-speed communication links 303 to other LINCs for coordination of activity of the local IIMs 300 groups. A supervisory utility 206A oversees the activity of the system 200A using command and communication links 207 connecting to the LINCs 302 and substations 204. The supervisory utility 206A is able to have interactive control of the local IIMs 300 via the communication links connecting it to the LINCs 302. FIG. 4 is a block diagram showing the main components of an intelligent IIM 300. Referring to FIG. 4, IIM 300 includes at least an impedance generation and injection module 100, an intelligent control capability 402 with at least a clock with time synchronization capability, and a high-speed communication link 410.

FIG. 5 shows an exemplary transformer coupled IIM 500 having two coupling transformers 506A and 506B that couple the IIM to the HV transmission line 108 to inject impedance into the HV transmission line 108 to do line balancing and disturbance elimination. A secondary transformer 501 is used as a sensor unit for any disturbances on the power line and also to extract power from the power line to provide the necessary power for converters 505A and 505B to generate the impedances required to be injected into the HV transmission line 108. The generation and injection are controlled by the input from the sensor and power supply unit 502 to a master controller 503 which provides input to controllers 504A and 504B coupled to the respective converters 505A and 505B.

BRIEF DESCRIPTION OF THE DRAWINGS

Embodiments of the disclosure are illustrated by way of example and not limitation in the figures of the accompanying drawings in which like references indicate similar elements.

FIG. 14 is a table showing time delays required to be synchronized to achieve a pseudo-sinusoidal waveform according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Figure 1:
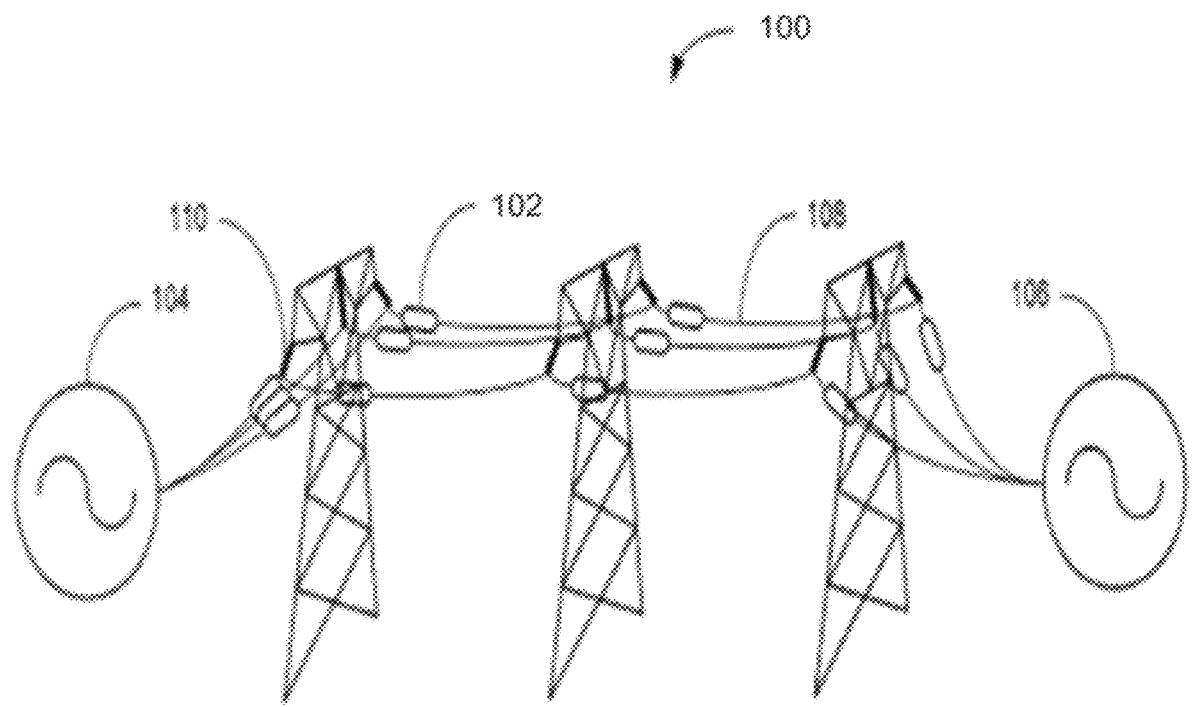
FIG. 1 is a block diagram illustrating conventional distributed impedance injection modules (IIMs) attached directly to an HV transmission line.
Figure 2:
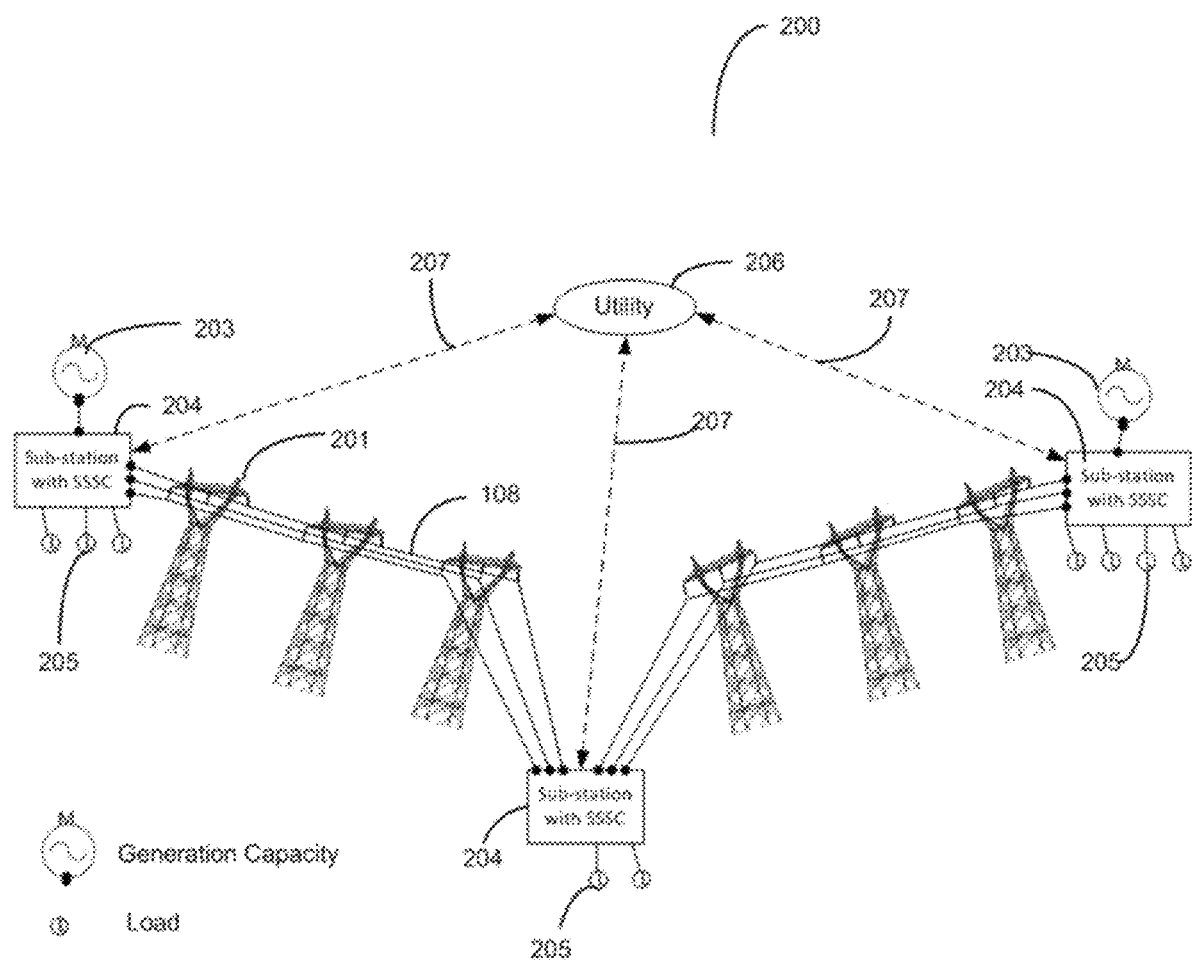
FIG. 2 is a diagram illustrating a conventional non-distributed control system based in substations with static synchronous series compensators (SSSC) for grid control.
Figure 2A:
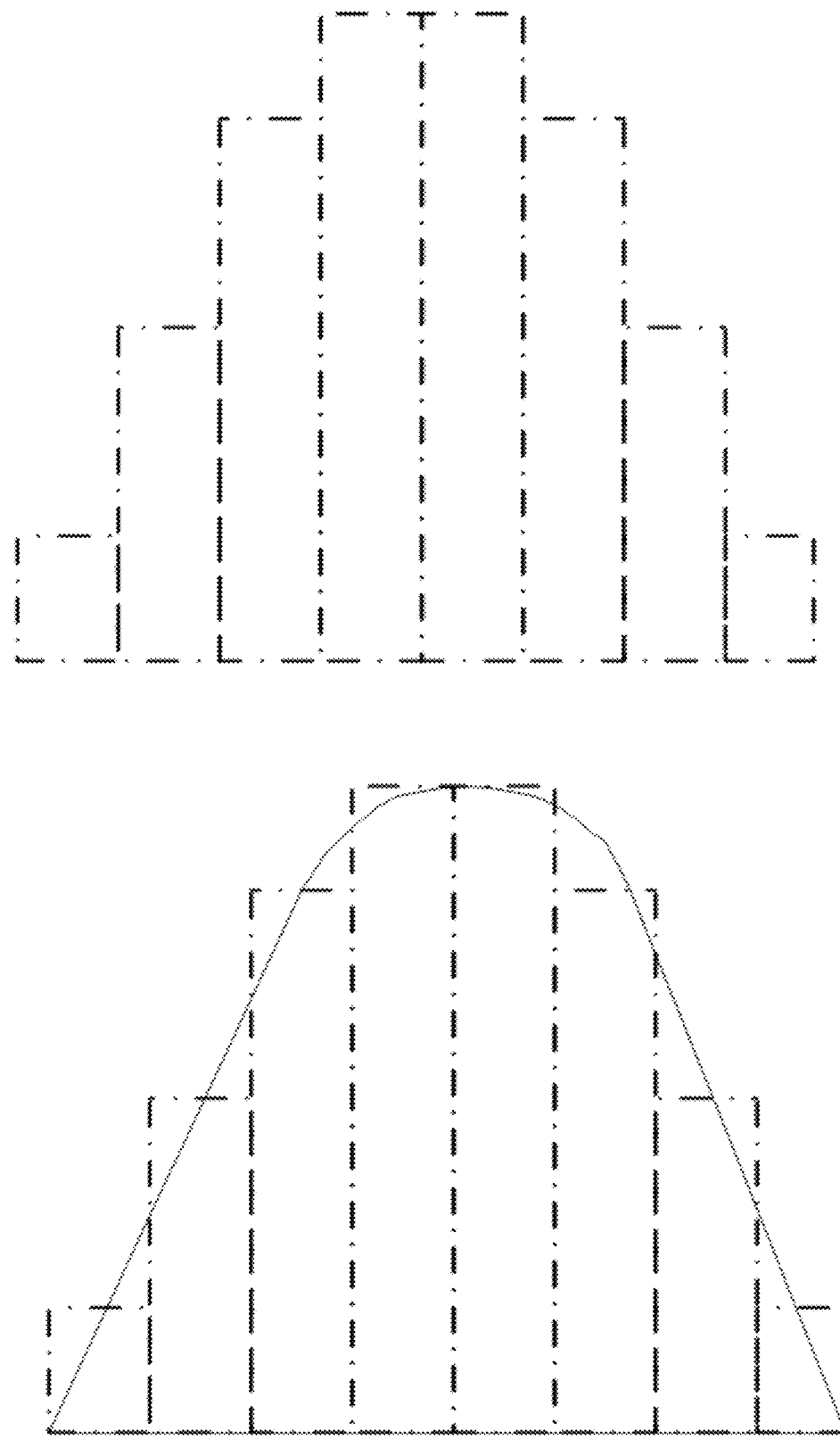
FIG. 2A shows the generation of a pseudo-sinusoidal waveform generation using high-power high-frequency switches.
Figure 3:
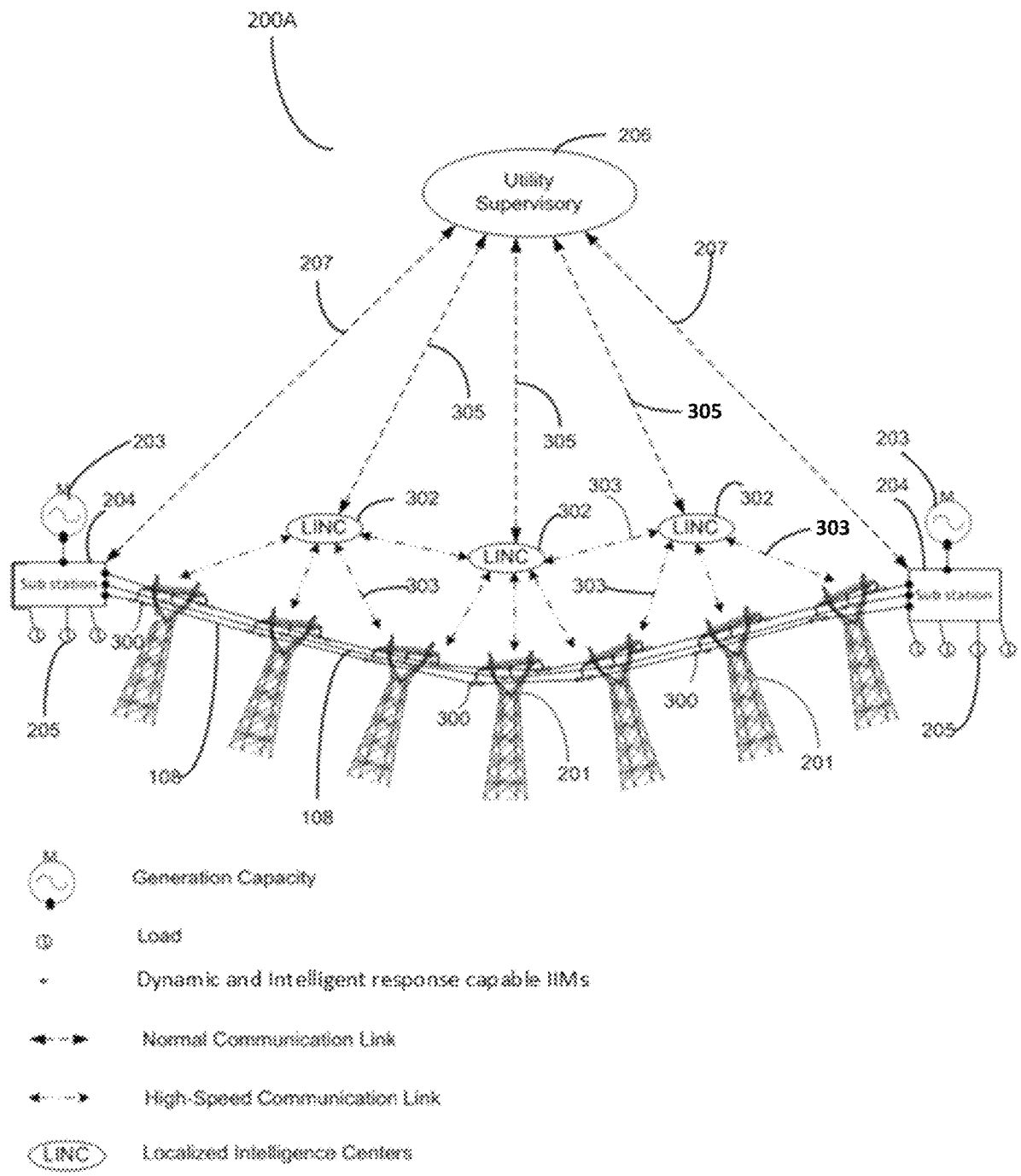
FIG. 3 is a diagram illustrating a conventional power grid system with a distributed and hierarchical intelligent control system.
Figure 4:
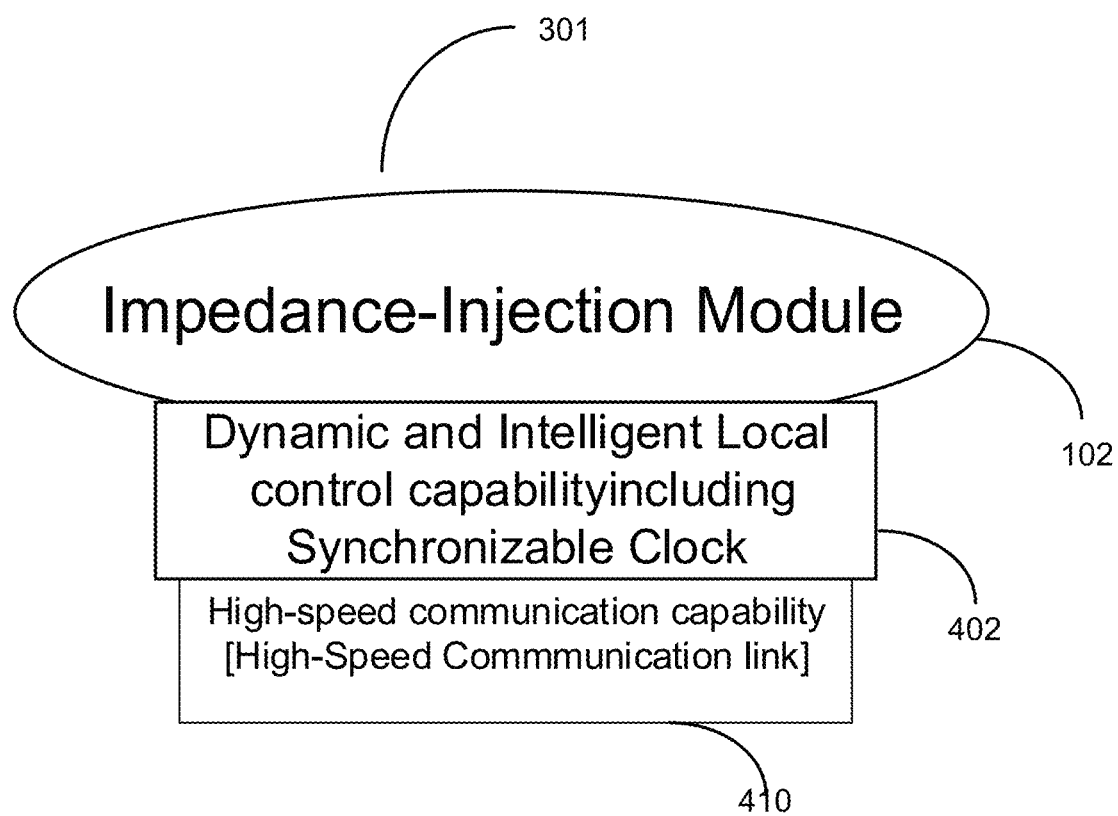
FIG. 4 is a block diagram illustrating a conventional dynamic intelligent impedance injection module with local and global time synchronization capability.
Figure 5:
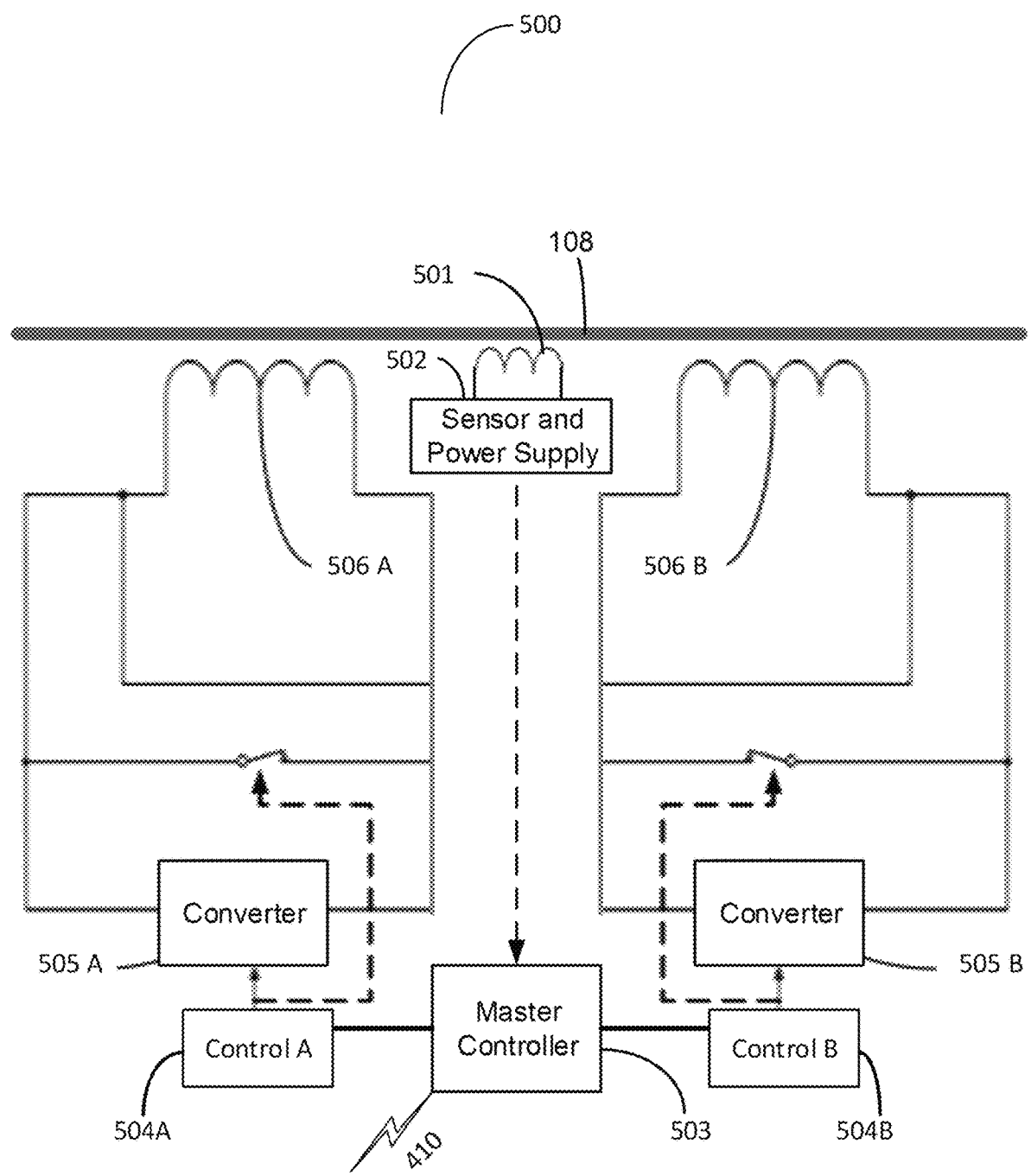
FIG. 5 is a circuit diagram illustrating a conventional dynamic response capable IIM with transformer coupling to an HV transmission line of a grid.
Figure 6:
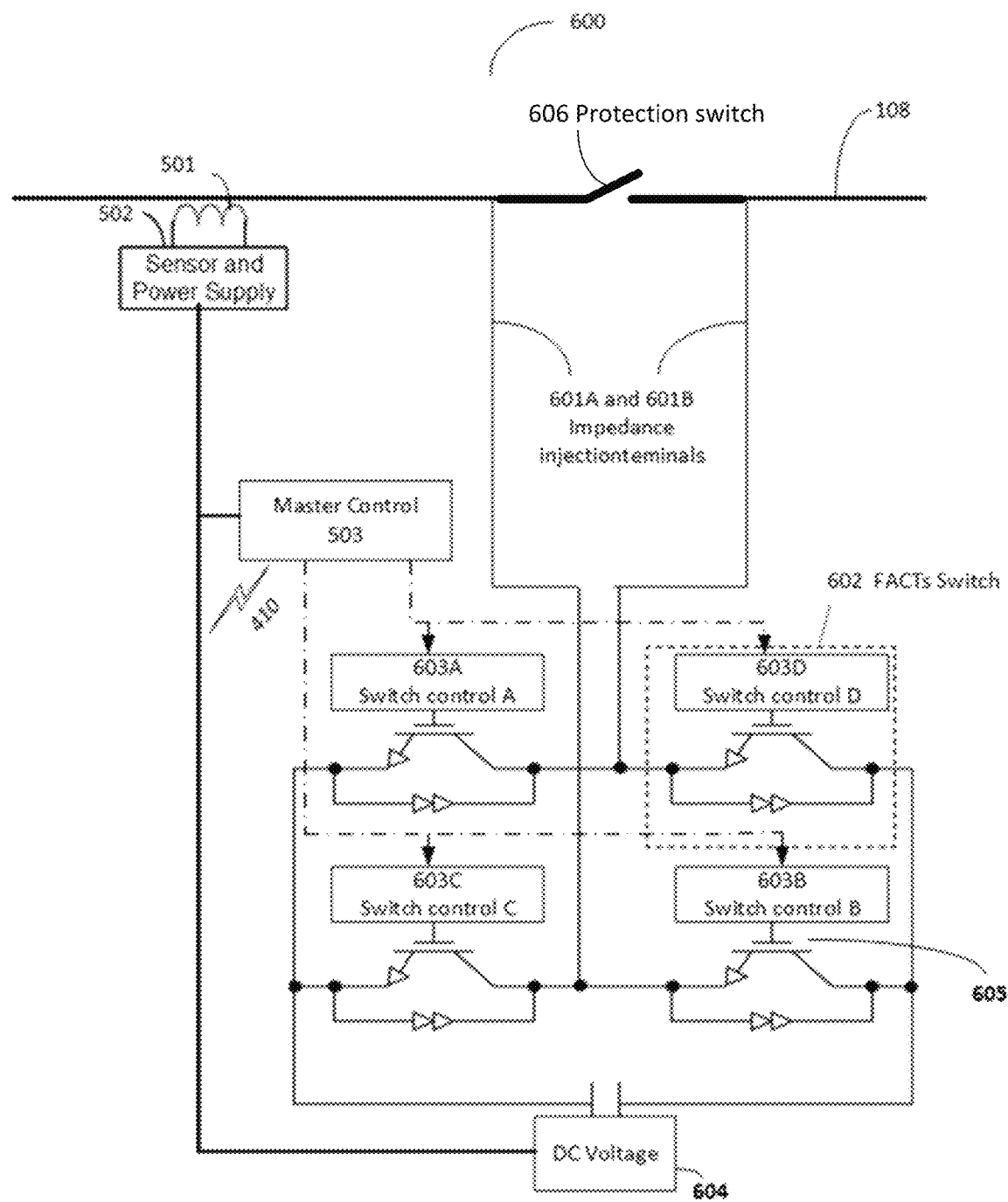
FIG. 6 is a circuit diagram illustrating an example of a transformer-less flexible alternating current (AC) transmission system (TL-FACTS) based impedance injection unit (IIU), where one or more IIUs may constitute an impedance injection module IIM.

Recently, transformer-less flexible alternating current (AC) transmission systems (TL-FACTS) that are lower in weight and cost have also been developed and implemented as IIUs for line balancing and control. An exemplary TL-FACTS-based IIU 600 is shown in FIG. 6. The TL-FACTS-based IIU 600 is powered by power extracted from the HV transmission line 108 via the secondary transformer 501 connected to the sensor and power supply block 502 and provided to the DC power source 604. Having DC power source 604 across the capacitor helps to improve the generation of the injected impedance across terminals 601A-B and optimize the impedance injection into the HV transmission line 108. A local master control 503 is enabled with intelligence to respond to the power line disturbances and imbalances sensed by the sensor and power supply module 502 coupled to the power line 108. The master local control 503 also has a local clock therein which is synchronizable with external clocks. The master local control 503 has high-speed wireless linkage or interface 410 connecting to the neighboring IIMs and the LINCs 302 via the high-speed links 303 (as previously described). These high-speed communication links are used to provide the switching control and synchronization signals to the master local control 503 which in turn provide the necessary control instructions to the switch control blocks 603A-D of FACTS switches 602 where each FACTS switch 602 includes a control block (e.g., control blocks 603A-D) and FACTS device 605. FACTS device 605 includes a switching device (e.g., bipolar junction transistor (BJT), field-effect transistor (FET), metal-oxide-semiconductor field-effect transistor (MOSFET), or the like). Based on the switching control signals from master local control 503, each of the switch control blocks 603A-D controls its respective FACTS device 605, which in turn controls impedance injection terminals 601A-B that are connected in series across the HV transmission line 108. The TL-FACTS-based IIU 600, due to its low weight, allows a number of them to be connected or coupled to the HV transmission lines 108 and operate in series or parallel mode, or a combination thereof. A single or a plurality of inter-connected TL-FACTS-based IIU 600 may form a single IIM 300 that is connected directly to the high voltage power lines 108 and operate with a pseudo-ground at the HV powerline voltage. A protection switch 606 (i.e., open/close) is provided that is used to close and short the impedance injection terminals 601A-B during fault conditions on the HV transmission line 108 and hence to bypass the circuits of the TL-FACTS-based IIU 600 included in the distributed IIM 300 and protect the FACTS devices and control circuit from damage and failure.

As described, IIMs 300 extract power from the HV transmission line to generate and inject impedance into the power lines in an intelligent manner to control and balance the power flow on the grid. The self-aware IIMs 300 having built in data processing capability and intelligence for local decision making are also provided with high-speed communication capability or interface 410 that allow sub-cyclic communication between the local IIMs 300 within a local area and the connected LINCs 302. The LINCs 302 distributed across the local areas are also enabled with highspeed communication capability that allow them to communicate at sub-cyclic speeds to neighboring LINCs 302. Hence, the distributed IIMs 300 are able to identify and react very fast to the changes and disturbances in the power line characteristics at the local level in a coordinated fashion. In addition, as detailed earlier, these intelligent IIMs 300 provide a capability to have localized control of line current and line balancing with interactive response capability where needed. Where necessary the IIMs 300 in neighboring local areas are able to work in coordination through the communicably coupled LINCs 302 to react to disturbances on the HV transmission line 108 and to provide response to instructions and commands from supervisory utility 206 and for local line management. The high-speed communication capability and hierarchical control capability are disclosed in the co-pending U.S. patent application Ser. No. 15/068,397, filed on Mar. 11, 2016, currently issued as U.S. Pat. No. 10,097,037, the disclosure of which is incorporated herein by reference in its entirety.

The IIMs 300 with or without transformers still inject square waves into the power line, but at reduced amplitudes. Being of low amplitude injection, these individual impedance injections, typically in the form of voltages, tend to be less prone to generate harmonic oscillations on the HV transmission lines 108. But when high voltages are to be generated and injected into the HV transmission line 108, for interactive control based on inputs from supervisory utility 206 for power system management and/or for power flow control and line balancing applications, one embodiment of the disclosed method uses a number of IIUs 600 of more than one distributed IIMs 300, from one or more local areas, that work together to inject impedance into the power line. The injected voltages are then additive (or aggregated) and hence can create harmonic oscillations in the HV transmission line 108. Hence it is ideal if the impedance injections from this plurality of distributed IIMs 300 can be made pseudo-sinusoidal in nature, which can then be smoothed to a sinusoidal waveform without incurring the expenses of high-speed, high voltage switching circuits used prior substation-based implementations of static synchronous series compensators (SSSCs) 204 connected to power lines 108 and controlled directly by utility 206.

Figure 7:
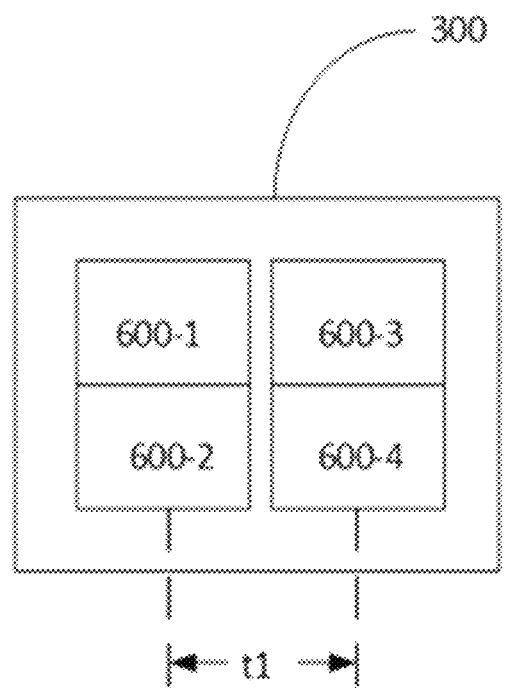
FIG. 7 is a block diagram illustrating an IIM having a series-parallel connection comprising four TL-FACTS-based IIUs according to one embodiment.
Figure 7A:
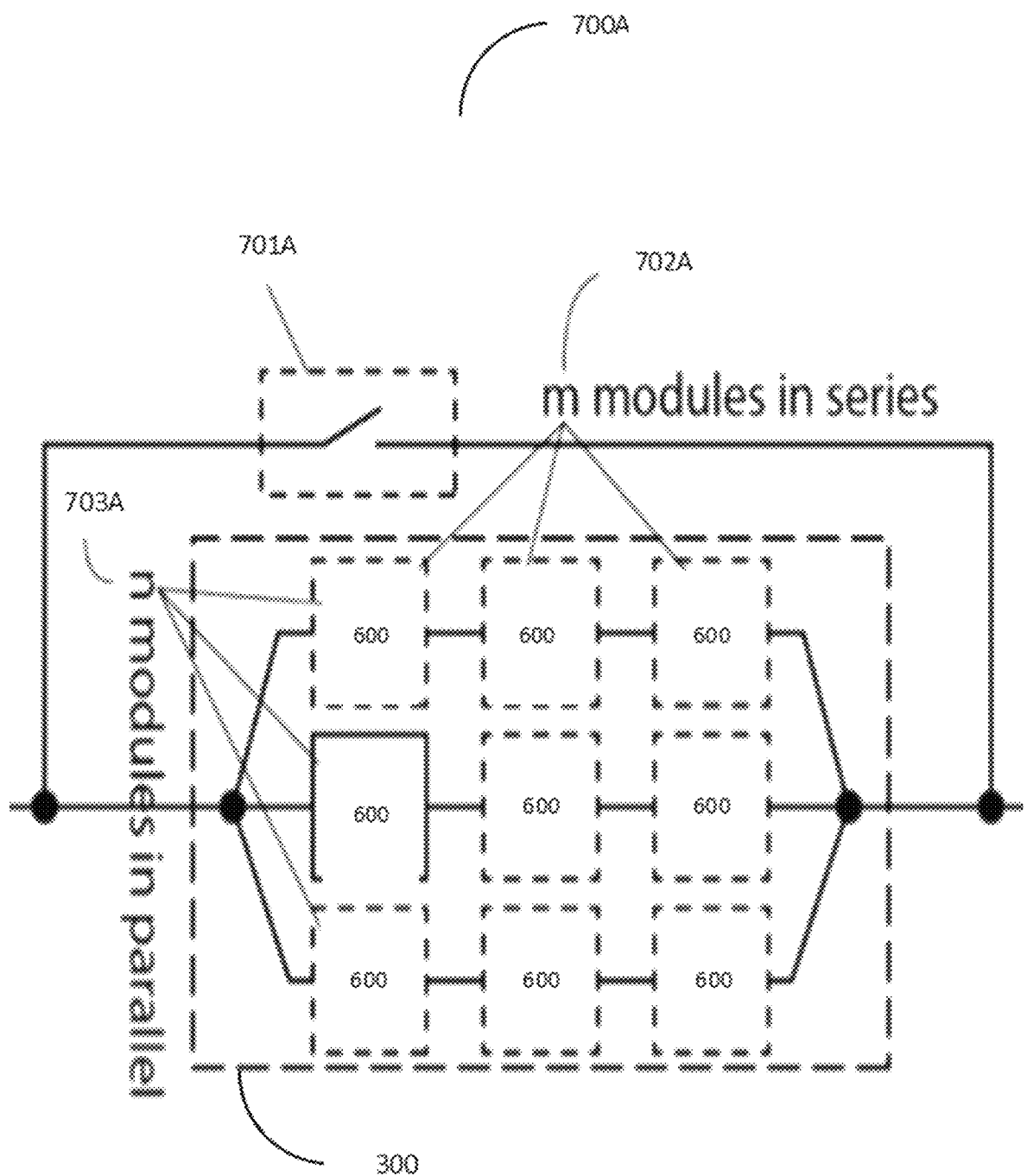
FIG. 7A is another exemplary block diagram of an IIM as a power flow control subsystem having nine TL-FACTS-based IIUs interconnected in a 3×3 Matrix, as an example, for use in a mobile power flow control application according to another embodiment.
Figure 7B:
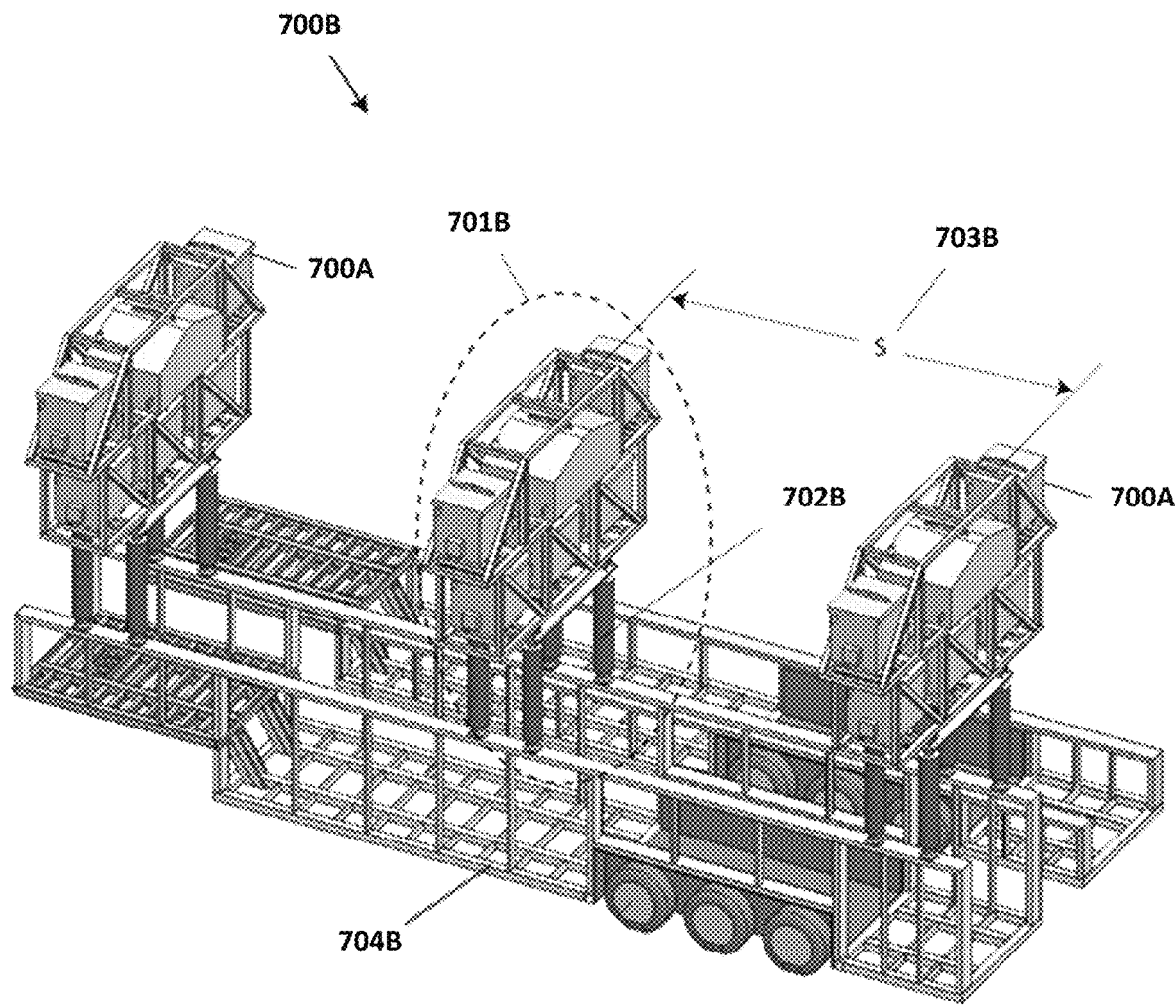
FIG. 7B is an exemplary illustrative diagram of a mobile platform having three power flow control subsystems for the three high-voltage lines of a power grid.
Figure 7C:
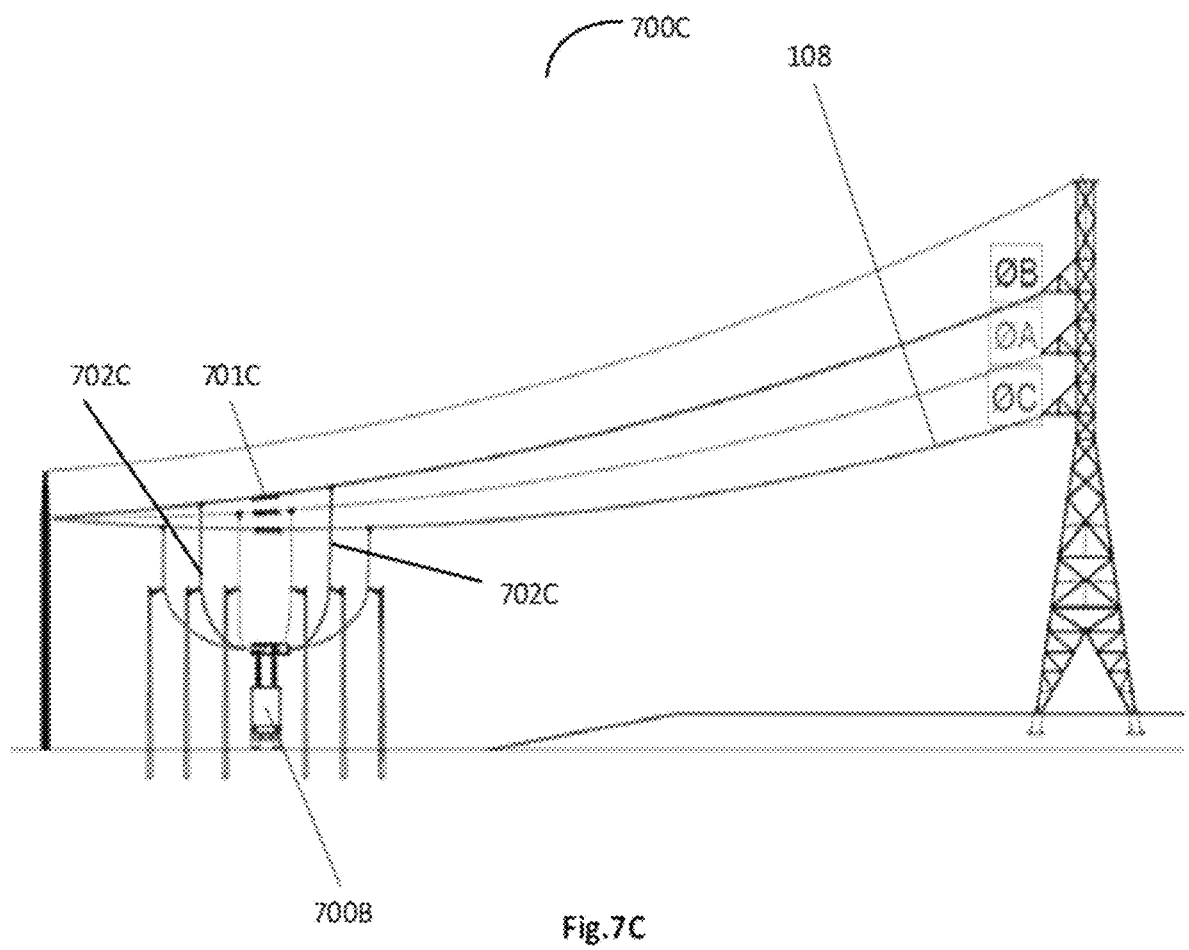
FIG. 7C is an exemplary illustrative diagram of the subsystems as deployed by the mobile platform and connected to the power grid.

Another embodiment, as shown in FIGS. 7B and 7C, is to have a plurality of interconnected IIUs 600 forming IIM 300 assembled on one or more mobile platforms that can be transported and deployed as needed at locations along the HV transmission lines of any power grid system to provide any necessary interactive control capability.

Yet another embodiment is the ability to have plurality of interconnected IIUs 600 forming IIM 300 assembled at sub-stations as mobile units or ground based units and connected to the high-voltage power lines of the grid to provide any necessary interactive control capability.

According to one embodiment, a system for injecting impedance into a high voltage (HV) transmission line is disclosed. The system includes one or more distributed impedance injection modules (IIMs) 300 coupled to the HV transmission line 108. Sensors attached to each power line, in some embodiments as part of each IIM 300 that includes a secondary winding or other alternate sensing capability, are configured to detect disturbance, power flow imbalance or other changes in the characteristics, such as temperature increases or vibration, of the HV transmission line 108 to which the sensors are attached. The sensed changes such as disturbance, flow imbalance or other change in the characteristics of the HV transmission line are communicated to the IIM 300, the LINCs 302 and the supervisory utility 206 over available communication links. A master control module 503 of the IIM 300 is configured to identify available resources on the HV transmission line, and generate and provide switching control signals to the identified resources for controlling impedance injection to provide interactive control capability to commands and instructions from the system supervisory utility 206 and also respond to any detected disturbance, power flow imbalance or changes in the characteristics of the HV transmission line 108. A local clock coupled to the master control module is configured to command a start of impedance injection and a stop of the impedance injection by the identified IIUs 600 as resource. The impedance injection is controlled by master control module 503, wherein the local clock is synchronizable with other local clocks in the one or more distributed IIMs and also clocks in the LINCs coupled to the IIMs 300.

According to one embodiment, a method for synchronized injection of impedance into a high voltage (HV) transmission line 108 is disclosed. The method is performed by an impedance injection module (IIM) 300 coupled to the HV transmission line 108. One disclosed method includes identifying disturbance, power flow imbalance or changes in characteristics of the HV transmission line by the master control 503 of the IIM 300. The method may also include receiving a command from the network operator/supervisory utility 206 and providing an interactive response to the command from the network operator/supervisory utility 206 who identifies problems or system control needs of the grid system and provide commands and interactive control instructions. The method may further include defining, by an intelligent master control module 503, an impedance injection waveform in response to the identified disturbance or imbalance, generating injection information comprising synchronization timing based on the generated impedance injection waveform, sending the injection information to one or more neighboring IIMs 300, identified as available resources, and initiating impedance injection into the HV transmission line based on the injection information.

According to an embodiment, a system for injecting impedance into an HV transmission line using multiple distributed IIM 300 comprising multiple TL-FACTS-based IIUs 600 is disclosed. As an example: The system includes one or more TL-FACTS-based IIUs 600 connected in a series and/or parallel combination to be a first IIM 300 having a first coordinated impedance injection capability into the HV transmission line 108, and where applicable, a second group of TL-FACTS-based IIUs 600 connected in series and/or parallel combination to be a second IIM 300 having a second coordinated impedance injection capability into the HV transmission line 108. The first group of TL-FACTS-based IIUs 600 and the second group of TL-FACTS-based IIUs 600 form two IIMs 300 that are distributed and connected in series with the HV transmission line 108, and are enabled for high-speed sub-cyclic communication. Each IIU 600 of each group is enabled to inject rectangular impedance, typically in the form of a voltage, on the HV transmission line based on the generated injection information for impedance injection comprising synchronization timing established by a master control 503 of the IIM 300 that recognized a disturbance. In order to reduce harmonic oscillation on the HV transmission line 108, the master control 503 is enabled to generate the impedance injection information such that the impedance injection from each IIU 600 be timed in such a manner that when aggregated the injected impedances form a pseudo-sinusoidal waveform. By synchronizing the time delay between the impedance injection from each of the IIUs 600 in a coordinated fashion, the first and the second impedance injections are enabled to cumulatively form the pseudo-sinusoidal impedance waveform for injection into the HV transmission line.

In the case where the available resources in one local area are insufficient and additional resources are needed to respond to a disturbance, the controller 503 of the IIM 300 identifying the resources is enabled to connect to and access the needed additional resources from neighboring local areas via the high-speed communication capability to the LINCs 302 and through it to the neighboring LINCs 302.

There are four possible ways to implement the time synchronization of the clocks associated with the IIMs 300 (as previously discussed).

1. Using a master controller with a master clock that provides commands to the master control of each IIM 300 to start and stop impedance injection from the TL-FACTS-based IIUs 600 constituting the IIM 300 at the appropriate time. Typically, in this implementation the master controllers 503 is in the LINCs 302 which are enabled with high-speed communication links to the distributed IIMs 300 and to neighboring LINCs 302. In a LINCs 302 alone based implementation, the master controller 503 in the LINCs 302 are the only units that have clocks and instructions are transmitted over high-speed communication links to the distributed IIMs 300. Such a system will fail any time the communication link fails. Hence this type of implementation though lower in cost is not optimal.

2. Using the frequency and phase of the current flowing on the power line to establish a relative time, where one such method being by zero crossing detection to establish relative time. Each local master control module 503 has within it a zero-crossing detection capability and all commands as to when to start injection and when to stop injection are provided to the TIM 300 relative to the zero crossing. The IIMs rely on zero crossing as a reference for their internal timers. These have the disadvantage that correction of transmission frequency by impedance injection works better when used with an absolute time. Also, disturbances on the line can cause the timers to miss zero crossing events. This is a low-cost method but is not a reliable method at present, and hence not the preferred implementation.

In both the above cases the local master controllers do not have clocks associated with them. Hence they are lower cost solutions that depend on external clocks or zero crossing waveforms to initiate action. In general, these are not optimum for providing high speed corrective action to problems on the HV transmission lines.

3. Using local master controllers with synchronizable clock that is synchronized to a master clock at the utility 206 or LINCs 302 is the third option. In this case, a master controller either in the utility 206 or LINCs 302 can provide instructions and commands to the distributed IIMs 300 which can be temporarily stored. The TL-FACTS-based IIUs 600 included in the IIMs 300 then inject impedances into the HV transmission line according to the received and stored instructions. Intermittent communication failures do not impact the operation of the IIMs 300 in this instance as the local clocks can still function in a synchronous mode if the link gets re-established in short order. Hence for implementation on the grid system this is the currently preferred implementation.

Figure 6A:
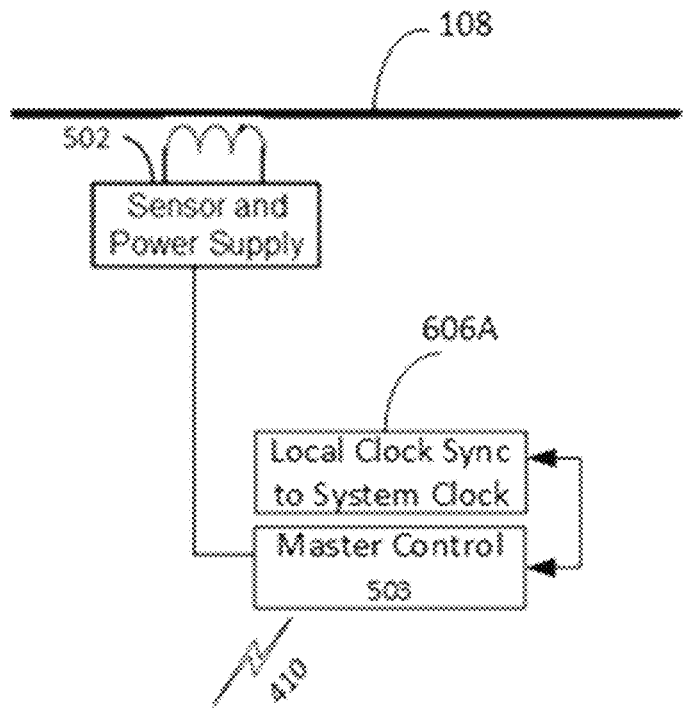
FIG. 6A is a circuit diagram illustrating a local master control module of a TL-FACTS-based IIU having an associated local clock according to one embodiment.

FIG. 6A is a circuit block diagram illustrating a local master control module of a TL-FACTS-based IIU having an associated local clock according to one embodiment. In FIG. 6A, local master control module 503 of an IIM (e.g., IIM 300) that is coupled to a local clock 606A that can be synchronized to a clock associated with the utility that connects with the LINC 302 and, using the communication capability connects to the local clocks of the IIM to provide local synchronization among all the local IIMs 300. Such a clocking system is simple to implement and provides the capability to synchronize all the local clocks of IIMs 300 connected under a LINC 302 by using the high-speed communication links 303 connecting all LINCs 302 across all IIMs 300 over the grid system 200A. Instructions downloaded to the local master control module 503 can be executed by the IIM 300 in a time synchronized fashion even if the communication links fail, as the local clocks retain synchronization for some period of time. The main disadvantage of such a system is that in the case of a long-time failure of the communication link 305 from the utility to the LINCs 302 or a failure of the high-speed link 303 from the LICs 302 to the IIMs 300, the local clocks 606A associated with the local IIMs 300 can go out of synchronization.

4. A fourth option is to have the local master controller with clocks that sync with a global master clock such as Global Positioning System (GPS) clock. This is the most accurate option and is shown in FIG. 6B.

Figure 6B:
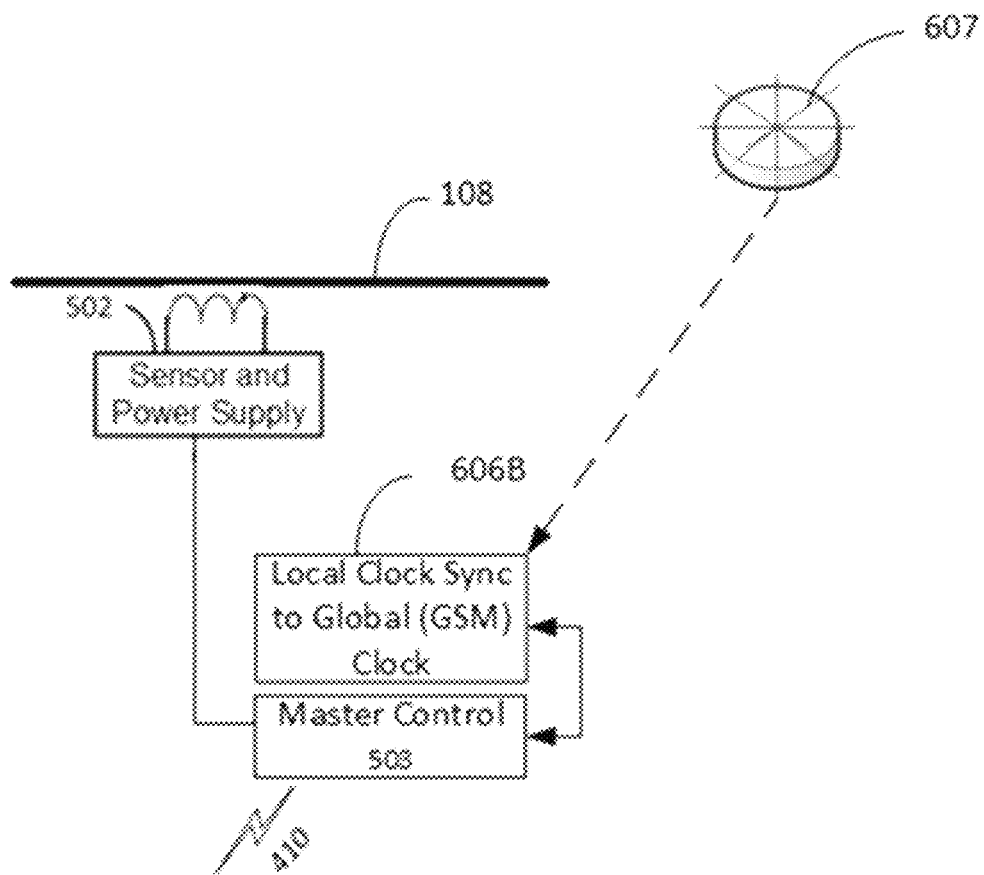
FIG. 6B is a circuit diagram illustrating a local master control module of a TL-FACTS-based IIU having an associated local clock that can be synchronized to a global clock according to one embodiment.

FIG. 6B is a circuit diagram illustrating a local master control module of a TL-FACTS-based IIM having an associated local clock that can be synchronized to a global clock according to one embodiment. In FIG. 6B, local master control module 503 having a local clock 606B associated therewith that can be synchronized to a global master clock such as GPS clock 607 to provide synchronization across the local and global IIMs 300 on the grid system 200A. Such a system is more complex and more expensive but ensures that in the case of any communication failure, the local clock 606B continues to function in a synchronized fashion providing any necessary synchronization input to the master control module 503 of the IIMs 300 and keeping the local and global IIMs 300 on the grid system 200A synchronized.

The embodiments are shown as examples only and other synchronization methods are also possible, such as having a GPS synchronizable clock on the LINCs 302 which is used to synchronize the local master clock modules associated with the IIMs 300 via the high-speed communication link 303. In such a case a failure of the communication between the LINCs 302 and the local controller 606A will result in the local IIMs 300 connected to the specific LINC 302 going out of sync while others across the grid 200 continuing to function correctly.

FIG. 7 is a block diagram illustrating an IIM having a series-parallel connection of TL-FACTS-based IIMs according to one embodiment. In FIG. 7, four TL-FACTS-based IIUs 600-1 to 600-4 collectively form (or included as part of) impedance injection module 300, which is to be suspended from a power line (e.g., HV transmission line 108). In one embodiment, IIUs 600-1 and 600-2 are connected in parallel, and IIUs 600-3 and 600-4 are also connected in parallel. In one embodiment, the two sets or pairs of parallel connected IIUs 600-1, 600-2 and 600-3, 600-4 are connected in series to form IIM 300. When a sinusoidal wave travels down the high voltage (HV) the power line 108, the time delay is t1 between the two pairs of IIUs.

The IIM 300 may include a single or a plurality of IIUs 600 (e.g., four or more as described above) interconnected in series-parallel configuration that can also be used as a basic subsystem unit in mobile power flow control application or installed at substations in some embodiments. FIG. 7A shows another exemplary and non-limiting implementation of IIM 300 as a power flow control subsystem 700A with multiple IIUs 600 in a series-parallel connection with 'm'=3 IIU 600 connected in a series string as shown in 702A with 'n'=3 such strings connected in parallel as shown in 703A to form the IIM 300 as subsystem 700A in an exemplary mobile power flow control application. A bypass protection switch 701A is shown which is used to protect the interconnected IIUs of the subsystem 700A in case of power surges and power system breakdown.

FIG. 7B shows an exemplary implementation of a mobile platform with three subsystems 700A on a mobile carrier 704B (e.g., a vehicle such as a trailer or any other wheeled vehicle capable of carrying equipment), with the subsystems 700A on insulators 702B that insulate them from ground and the sub-systems spaced way by a distance 'S' from each other in one embodiment. In one embodiment, the mobile carrier 704B is transportable to any remote or substation locations to provide power grid monitoring and control capability as required by the supervisory utility 206 for control and management of the total power system 200 for example.

FIG. 7C shows the mobile platform 700B with three connections to the three phases of high-voltage power lines 108 of power grid 700C. The three subsystems 700A are connected in series with the HV power lines 108 by breaking the HV power line 108 and supporting the two ends by insulator 701C to retain the tension of the HV power line. In one embodiment, each subsystem 700A (which may be a transformer-less subsystem) is then connected across the cut ends using connectors 702C.

Figure 8:
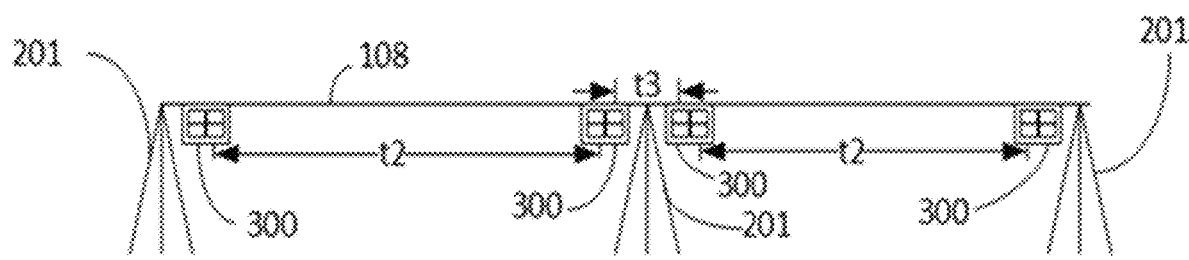
FIG. 8 is a block diagram illustrating the time delay between an exemplary group of IIMs distributed on an HV transmission line.

FIG. 8 is an exemplary block diagram illustrating the time delay between an exemplary group of IIMs distributed on an HV transmission line. Referring to FIG. 8, a set of four IIMs 300, each having four TL-FACTS-based IIUs connected in series-parallel combination (as previously described). The four IIMs 300 are designated as 300a, 300b, 300c and 300d distributed over the HV transmission line 108. The power line 108 is typically suspended from towers 201 and isolated from the towers, though they can also be connected to the power lines in other ways, such as installed on mobile platforms and connected to the power line therefrom or in a substation area to provide redundancy and expansion capability. The time delay between the IIMs 300a and 300b is designated as t2, the time delay between 300b and 300c is designated as t3, and the time delay between 300c and 300d is also designated as t2, as shown in FIG. 8.

Figure 9:
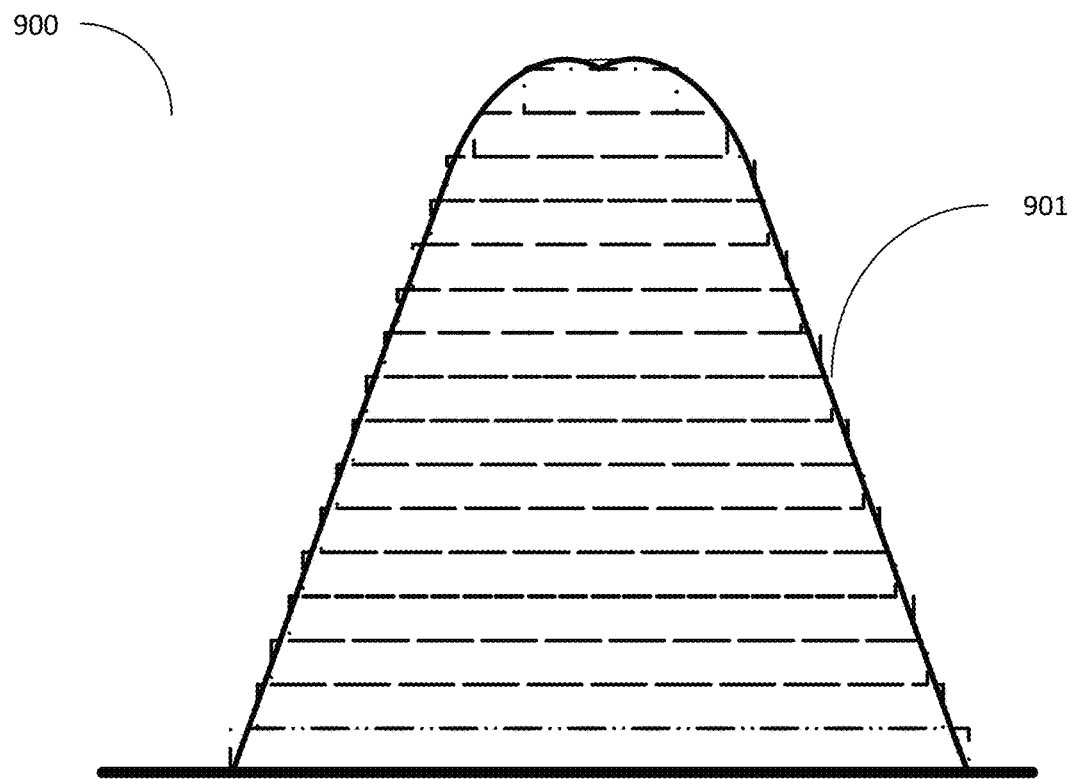
FIG. 9 is a diagram illustrating an exemplary smoothed sinusoidal waveform from a plurality of low impedance/voltage rectangular injected waveforms generated by a plurality of IIUs.
Figure 9:
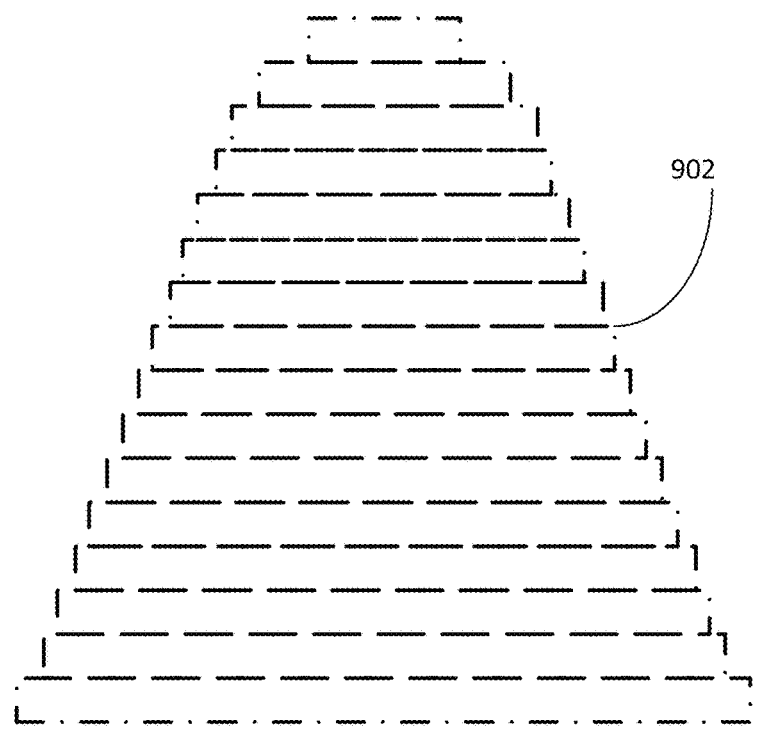

FIG. 9 is a diagram illustrating an exemplary smoothed sinusoidal waveform formed from a plurality of rectangular injected waveforms that are timed and synchronized. In FIG. 9, an example of a buildup of a pseudo-sinusoidal impedance waveform from 16 injected rectangular waves 902 is shown. The sinusoidal wave 901 is formed by smoothing out the cumulative impedance injections. The impedance injections are rectangular in shape. In one embodiment, a single impedance injection unit with a group of 16 TL-FACTS-based IIUs (e.g., IIU 600) in parallel connection attached to the HV transmission line can inject the exemplary 16 rectangular waveforms 902 from a single location with easy synchronization of the waveforms as shown. But this type of installation results in a large and heavy IIM 300, which makes it difficult to be supported directly on the HV transmission line. It also increases the cost of such IIMs as they are dedicated for high value impedance injection. When the IIMs 300 are lower weight series-parallel configurations, as shown previously, distributed over the HV transmission line 108, the synchronization and control for formation of the injected waveforms 902 become more difficult without the high-speed intercommunication and local synchronization of the clocks between the local IIMs 300 distributed across the HV transmission line and also the high-speed intercommunication between the neighboring LNCs 302.

Figure 10:
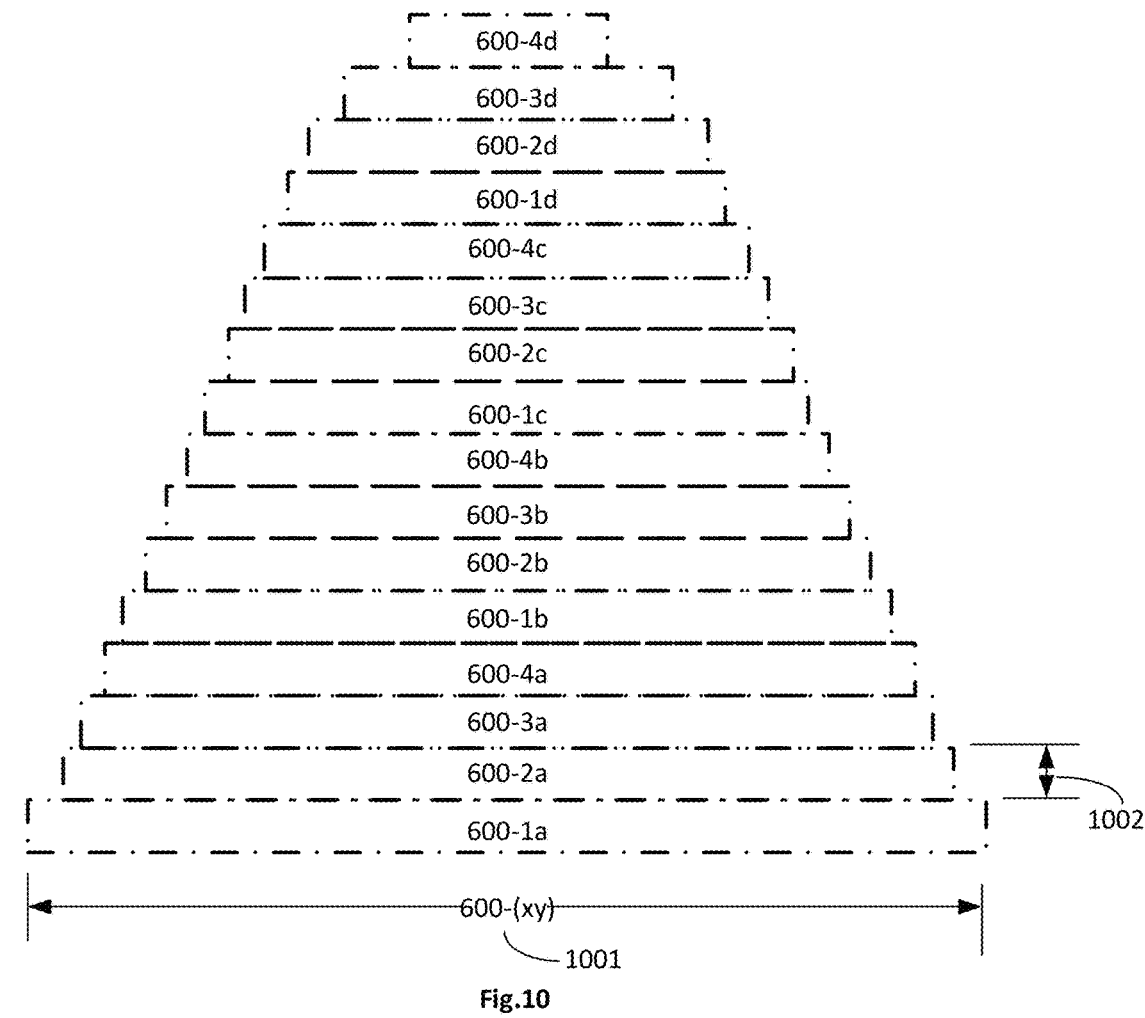
FIG. 10 is a diagram illustrating exemplary time-synchronized injection of rectangular waveforms injected into an HV transmission line to achieve a pseudo-sinusoidal waveform.
Figure 11:
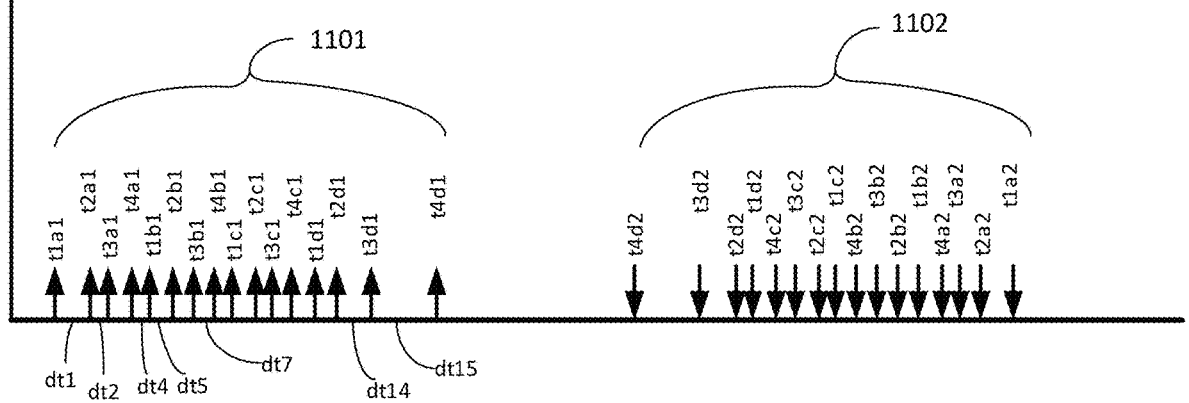
FIG. 11 is a diagram illustrating the timing required for generation of the pseudo-sinusoidal waveform.

FIG. 10 is a diagram illustrating exemplary time-synchronized injection of rectangular waveforms injected into an HV transmission line to achieve a pseudo-sinusoidal waveform. In FIG. 10, the injected waves from the groups of TL-FACTS-based IIUs 600-1 to 600-4 of FIG. 7 forms an IIM 300. Four such IIMs 300a-d, distributed over the HV transmission line 108 are shown in FIG. 8 as being used as resources for generation of the aggregated injected impedance waveform. The injected impedance from each of the TL-FACTS IIUs is identified by its designation 600-xy (e.g., 600-1a, 600-2a, 600-3a, and so on) where x is the designator number of the TL-FACTS-based IIU 600 in the IIM 300 and y is the designation of the IIM 300a, b, c or d, respectively. In this example, the amplitude of the injected waveform from each TL-FACTS-based IIU 600 is assumed to be a constant value 1002, though this is not mandatory. As shown in FIG. 10, the amplitudes of injected impedances are constant, though this is not mandatory as long as the variations are taken into account in the time delays for generating the pseudo sinusoidal waveform. The impedance injection waveform of each of the 16 TL-FACTS-based IUs 600 from the four IIMs 300 distributed over the HV transmission line in this case has to be synchronized for start of injection and stop of injection, with the impedance injections from the other 15 TL-FACTS IIUs to generate the pseudo-sinusoidal waveform. The start times 1101 and stop times 1102 requirement for generation and injection of the impedance injection are shown in FIG. 11. The duration of injection is shown in FIG. 10. In the case of mobile container based application, such as in a mobile system control application including power flow control or in a fixed location system control application including power flow control, such as a substation application, the time delays are negligible and only the synchronized and timed injection delays have to be taken care of in generating the necessary waveforms.

Since the IIMs 300,a, b, c, and d are distributed over the HV transmission line, the delays indicated in FIGS. 8 and 9 have to be accounted for to get the pseudo-sinusoidal waveform. The delays for the synchronization of the waveforms from the four IIMs 300 are shown in Table 1 of FIG. 14, including the start delay. For ease of understanding the first start is designated t0 and all others are shown referencing the t0 time.

Since the speed of transmission over the HV transmission line 108 is very fast, a 300-meter separation between IIMs will incur only a delay of about 1 to 2 microseconds. The transmission delays can be typically ignored at the present time and impedance injection can be synched to a time across a plurality of IIMs 300a-d. The method as described provides additional accuracy to the impedance injection scheme for future applications.

Having built-in intelligence and synchronizable clocks with high-speed communication capability 410 in each of the locally interconnected group of IIMs 300a-d with a local supervisory LINC 302 enable the set of IIMs to be locally and globally time synchronized. This helps to consistently generate the needed delays across the locally connected IIMs 300 to work as a group, to generate and inject the pseudo-sinusoidal waveform into the HV transmission line.

It should also be noted that the examples described are for clarifying the invention and not meant to be limiting. For example, many more than four TL-FACTS-based IIUs 600 may be used to form IIM 300 and a plurality of IIMs 300 distributed over the HV transmission line 108 communicatively interconnected in a local area connection can be used to generate and inject the needed impedance value with the needed number of synchronized injection waveforms to generate a pseudo-sinusoidal impedance waveform. It should also be noted that a similar waveform can be generated and injected in the other (negative) half cycle time as well.

Figure 12:
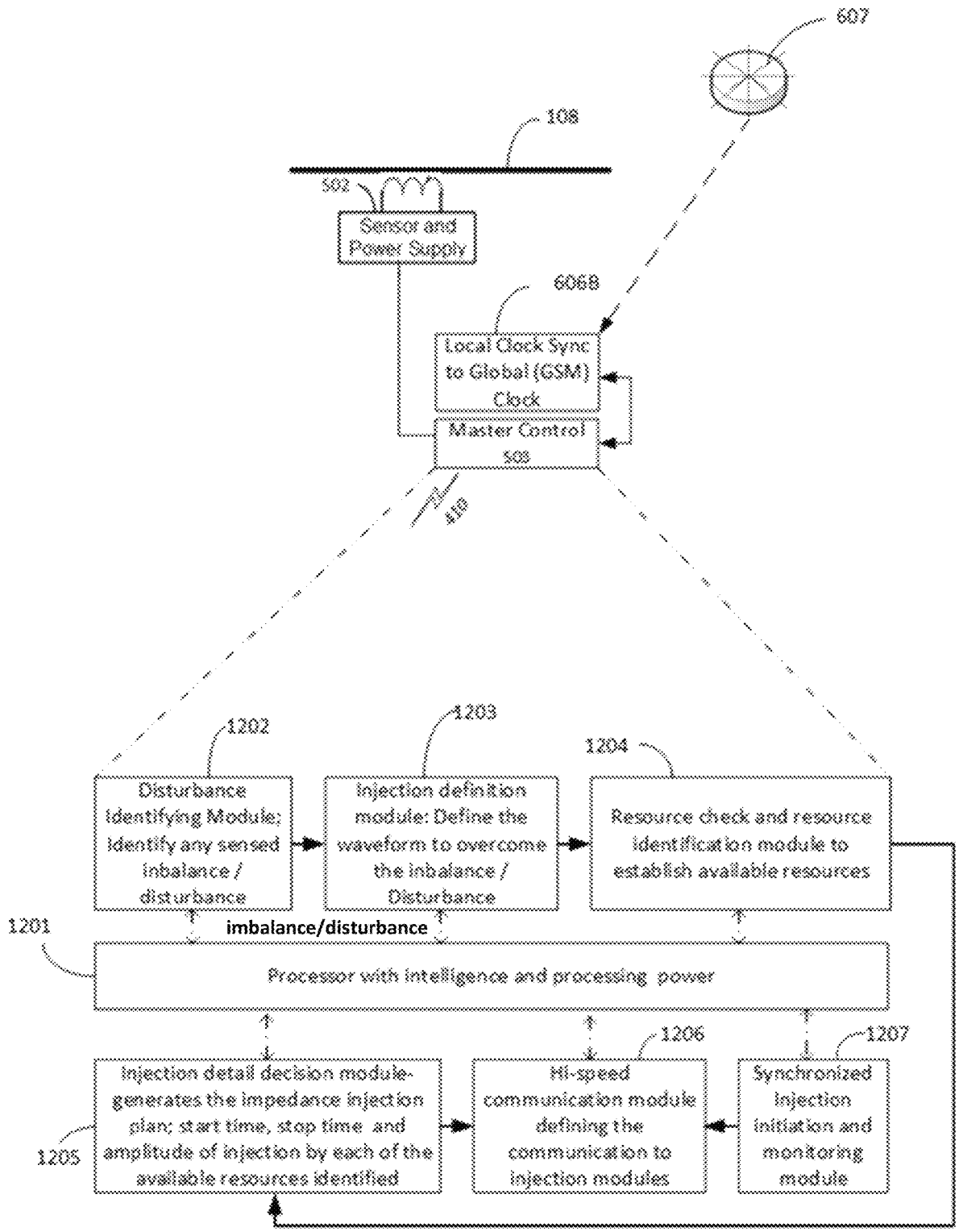
FIG. 12 is a diagram illustrating a local master control module with the processing capability for identification of disturbances on an HV transmission line according to one embodiment.

Other exemplary embodiments may have indicated the mobile platform and substation implementations where no time delays exist as all IIUs 600 are co-located. In addition to the examples of implementation above, having time synchronized intelligent IIMs 300 with sufficient processing power enables the IIMs 300 to provide interactive control for utilities for system management and also enables the IIMs 300 to recognize any disturbances and power flow imbalances locally on the high voltage power lines, coordinate with other distributed IIMs 300$s$, and generate the appropriate waveforms necessary to overcome such disturbances and power flow imbalances. The intelligent IIMs 300$s$ are also able to identify the available resources (e.g., available IIMs) in the local and global grid 200, for example, using the communication system to enable an integrated waveform generation capability using these resources when additional resources are needed to take corrective action. Such a local self-aware intelligent system control block diagram is shown in FIG. 12. The local master control 503 in this exemplary system includes an intelligent processing engine 1201 that provides the intelligence and independent decision-making capability to the IIM 300. The sensors attached to the power lines sense and extract the condition of the HV transmission line to which they are coupled. The sensors provide the sensed information typically to the utility in one embodiment and in another embodiment described here the information is sensed locally and provided to a local module that is a disturbance/flow imbalance identifying module 1202 that identifies changes in the characteristics of the HV transmission line.

In all the cases, whether it is the embodiment where the utility receives the sensed information and provide the commands in response to the received information, or the embodiment where the sensing and flow control is locally handled, the utility is enabled to provide interactive instructions and commands to the local IIMs for impedance injection to meet target grid system control objectives. In this case the local disturbance/flow imbalance identification module 1202 is unused as the IIMs 300 respond interactively to the commands and instructions for impedance injection from the supervisory utility 206. These impedance injection instructions received by the IIM 300 in this embodiment are passed to the local injection definition module 1203 for execution.

In the embodiment shown in FIG. 12 and described herein, the identified changes of the HV power line are passed to the injection definition module 1203 for corrective execution by the disturbance/flow imbalance identification module 1202.

A local injection definition module 1203 uses the instructions received from the supervisory utility 206 in the first embodiment or the identified disturbance data from 1202 in the second embodiment to define the response waveform to be injected. A resource check and resource identification module 1204, in high-speed communication with the local IIMs 300$s$ and the LINC 302 via communication links 303, through a communication module 1206, collects the information on the availability of resources to achieve the necessary injected impedance waveform. An injection detail decision module 1205 generates the detailed injection needs by each of the identified resource available to the IIMs 300. A start of injection time, an end of injection time, and amplitude of injection for each of the identified resources comprise the details. This information is transmitted to the respective resource IIM 300 over the high-speed communication link 303 by the communication module 1206 over wireless connection established using the wireless communication capability 410. Once the response capabilities for corrective action to be taken for the disturbance on the HV transmission line are established and communicated, an injection initiation and monitoring module 1207 initiates the injection of the waveform and monitors its progress, via the high-speed communication links of the communication module 1206. The monitoring module 1207 will continue to monitor and repeat the injection until the imbalance is corrected or the root cause of the disturbance is removed.

Figure 13:
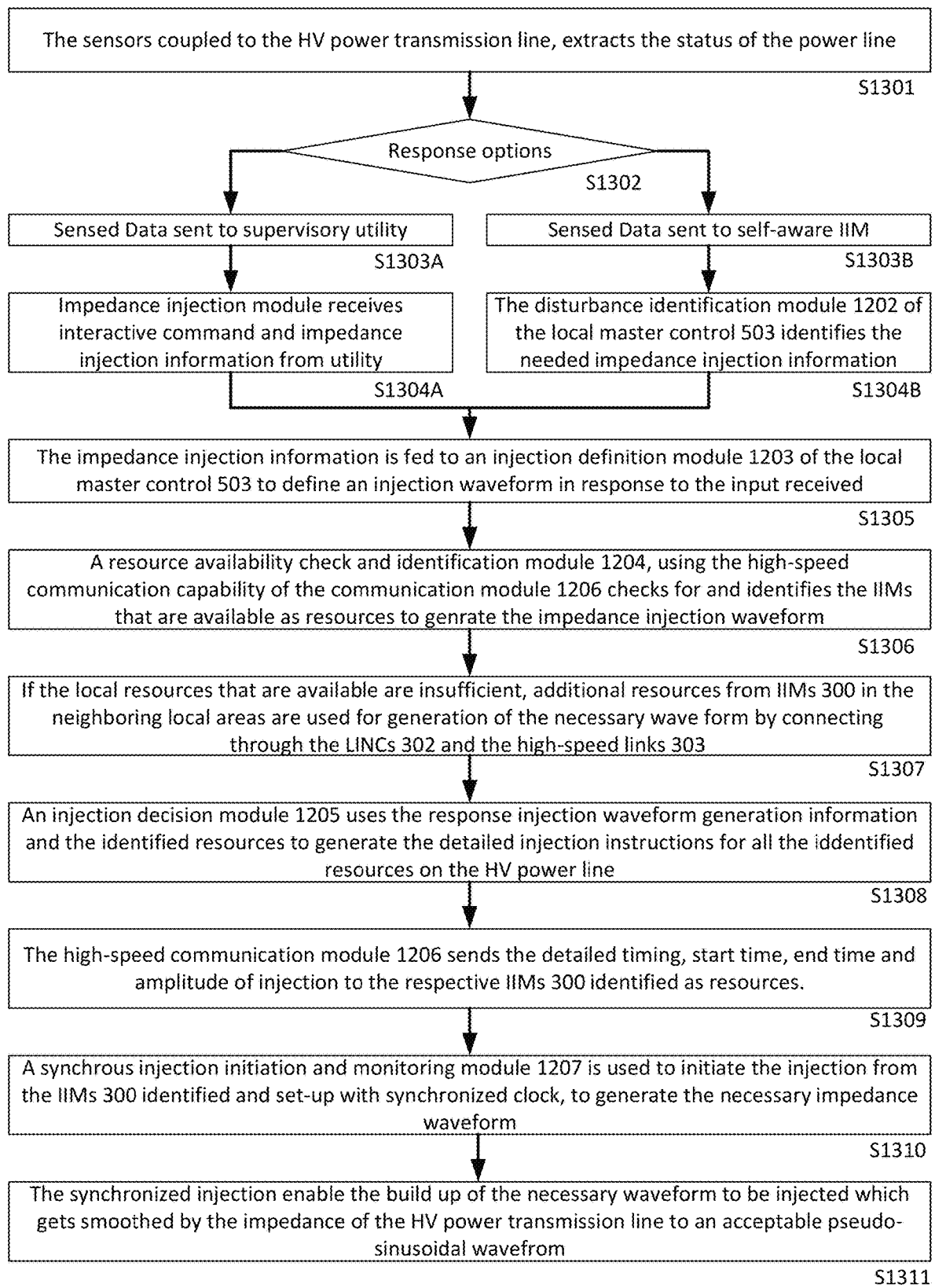
FIG. 13 is a flow diagram of a process for power grid system control using synchronized injection of impedance according to one embodiment.

FIG. 13 is an exemplary flow diagram of the process for providing HV transmission line control using synchronized injection of impedance according to one embodiment. The process, for example, may be performed by an intelligent IIM (e.g., IIMs 300*a-d*), and the distributed IIMs 300 having their clocks synchronized across the grid or responding interactively to commands and information from supervisory utility (as defined by S1302).

At step S1301, sensors coupled to the HV power transmission line sense changes in the grid characteristics (e.g., temperature increases or vibration) and power flow.

Two options exist for handling the sensed data as shown at step S1302.

In a first embodiment (option 1), the sensed information is transmitted to the supervisory utility 206 at step S1303A. The supervisory utility processes the received data and generates and provides control commands for impedance injection back to a local master controller in an IIM as shown at step S1304A.

In a second embodiment (option 2), the sensed data is sent to the local master control 503 of the IIM 300 as at S1303B. A disturbance identification module 1202 of the local master control 503 identifies the type of local problems and disturbances on the grid from the extracted information and generates instructions for impedance injection (S1304B).

The local master controller 503 with the intelligence and processing capability 1201 built into the IIM 300 receives the impedance injection instruction and creates an impedance injection solution, in the form of a waveform that can resolve the identified problem or disturbance and re-establishes stability to the HV transmission line 108 of the grid 200 (S1305).

The IIM 300 then with the communication capability 1206 having hi-speed links 303 connecting it to the local distributed local IIMs 300*s*, identify the active resources that may or may not be FACTS devices and controllers that are readily available to generate the necessary waveform of the impedance injection solution using resource check and identification module 1204 of the local master controller 503 (S1306).

If the local area resources available to the IIM 300 are insufficient for generation of the waveform of the impedance injection solution, the resource availability of the neighboring location IIMs 300 connected through the LINCs (e.g., LINCs 302), or even the further out, distributed IIMs 300 available on the high voltage transmission line are identified for use in generation of the impedance injection waveform to resolve the problem or disturbance on the HV transmission line of the grid (S1307).

For example, IIM 300A, using the intelligence and processing power built in, further extracts the capability of each of the identified resources and puts together an impedance generation and injection pattern which has the time of the start of injection, the amplitude of the injection and the stop time of the injection to generate the necessary sequence, that, when combined, produce the waveform shape and amplitude to overcome the problem or disturbance on the grid 200 (S1308).

The impedance injection pattern for generation of the response impedance waveform for injection into the HV transmission line 108 is provided to the respective identified resource via the high-speed communication links 303 (S1309).

The identified distributed IIMs 300 identified as available resources, interactively working together in time synchronization, are able to produce the necessary impedance injection waveform and inject it into the high voltage power lines of the grid (S1310).

The combined injected pseudo-sinusoidal waveform, generated by the aggregation of the individual injected impedance waveforms, is smoothed by the impedance of the HV transmission line to reduce any unwanted oscillations due to the impedance injection while providing the required impedance injection response for system control. (S1311).

Even though the invention disclosed is described using specific implementations as examples, it is intended only to be exemplary and non-limiting. The practitioners of the art will be able to understand and modify the same based on new innovations and concepts, as they are made and become available. The invention is intended to encompass these modifications that conform to the inventive ideas discussed.

What is claimed is:

1. A system for impedance injection into a high voltage (HV) transmission line, comprising:
   a plurality of impedance injection modules (IIMs) each having a plurality of transformer-less flexible alternating current transmission system (TL-FACTS)-based impedance injection units (IIUs) in series-parallel connection;
   each of the plurality of IIUs having a master control module of a plurality of master control modules to coordinate with and synchronize the plurality of IIUs to generate, as a group, an impedance injection into the HV transmission line; and
   wherein the master control module to coordinate with the plurality of IIUs comprises the master control module to determine needed delays and needed number of synchronized injection waveforms to generate and inject a pseudo-sinusoidal impedance waveform, as the impedance injection, into the HV transmission line.

2. The system of claim 1, wherein the group is to generate a plurality of impedance injections each rectangular in shape to build up the pseudo-sinusoidal impedance waveform for the impedance injection.

3. The system of claim 1, wherein the master control module to synchronize the plurality of IIUs comprises the master control module having a first local clock to synchronize with local clocks of other master control modules of other IIUs of the plurality of IIUs.

4. The system of claim 1, wherein each of the master control modules of each respective IIU of the plurality of IIUs is to synchronize to a Global Positioning System (GPS) clock, to provide the synchronization across the plurality of IIUs.

5. The system of claim 1, wherein each of the master control modules is to synchronize to a master clock at a utility or a local intelligence center (LINC).

6. The system of claim 1, wherein each of the plurality of IIMs further having hi-speed communication links through which the master control module to coordinate with the plurality of IIUs to generate and inject the impedance injection.

7. The system of claim 1, wherein the plurality of IIMs are coupled in series to the HV transmission line.

8. An impedance injection module (IIM), comprising:
   a plurality of transformer-less flexible alternating current transmission system (TL-FACTS)-based impedance injection units (IIUs) in series-parallel connection;
   wherein each of the plurality of IIUs includes a master control module to coordinate with and synchronize the plurality of IIUs to generate, as a group, an impedance injection into a high voltage (HV) transmission line; and
   wherein the master control module to coordinate with the plurality of IIUs comprises the master control module to coordinate with other master control modules included in other IIUs among the plurality of IIUs to determine needed delays and needed number of synchronized injection waveforms to generate and inject a pseudo-sinusoidal impedance waveform as the impedance injection.

9. The impedance injection module of claim 8, wherein:
   the group is to generate a plurality of impedance injections each rectangular in shape to build up the pseudo-sinusoidal impedance waveform for the impedance injection.

10. The impedance injection module of claim 8, wherein the master control module to synchronize the plurality of IIUs comprises the master control module having a first local clock to synchronize with other local clocks of the other master control modules of the other IIUs of the plurality of IIUs in the group.

11. The impedance injection module of claim 8, wherein the master control module has a local clock with capability to synchronize the local clock to a Global Positioning System (GPS) clock, to provide the synchronization across the plurality of IIUs.

12. The impedance injection module of claim 8, wherein the master control module has a local clock with capability to synchronize the local clock to a master clock that is at a utility or a local intelligence center (LINC), to provide the synchronization across the plurality of IIUs.

13. The impedance injection module of claim 8, further comprising hi-speed communication links through which the master control module is to coordinate with the other master control modules throughout the plurality of IIUs to generate and inject the impedance injection.

14. The impedance injection module of claim 8, wherein the impedance injection module is coupled in series to the HV transmission line.

15. A method for impedance injection into a high voltage (HV) transmission line, comprising:
   connecting, to the HV transmission line, a plurality of impedance injection modules (Ms) each having a plurality of transformer-less flexible alternating current transmission system (TL-FACTS)-based impedance injection units (IIUs) in series-parallel connection; and
   through a master control module of each of the plurality of IIUs of each of the plurality of IIMs, coordinating with and synchronizing the plurality of IIUs to generate, as a group, an impedance injection into the HV transmission line, wherein the master control module is among a plurality of master control modules respectively included in the plurality of IIUs;
wherein the coordinating with and the synchronizing the plurality of IIUs comprises determining, through the master control module, needed delays and needed number of synchronized injection waveforms to generate and inject a pseudo-sinusoidal impedance waveform as the impedance injection.

16. The method of claim 15, further comprising:
generating, by the group, a plurality of impedance injections each rectangular in shape to build up the pseudo-sinusoidal impedance waveform for the impedance injection.

17. The method of claim 15, further comprising:
synchronizing a local clock of each master control module of the plurality of master control modules to a Global Positioning System (GPS) clock, to provide the synchronization across the plurality of IIUs.

18. The method of claim 15, further comprising:
synchronizing a local clock of each master control module of the plurality of master control modules to a master clock at a utility or a local intelligence center (LINC), to provide the synchronization across the plurality of IIUs.

19. The method of claim 15, wherein the coordinating with the plurality of IIUs comprises:
communicating among the plurality of master control modules of the plurality of IIUs through hi-speed links to generate and inject the impedance injection.

20. The method of claim 15, wherein connecting, to the HV transmission line, the plurality of IIMs comprises connecting, in series to the HV transmission line, the plurality of IIMs.

21. A system for injecting impedance into a high voltage (HV) transmission line, the system comprising:
a plurality of impedance injection modules (IIMs), each of the plurality of IIMs connectable to a respective segment of the HV transmission line and operable by extracting power from the respective segment of the HV transmission line;
a plurality of distributed sensors configured to detect issues on the HV transmission line and to transfer the detected issues to a local impedance injection module (IIM) among the plurality of IIMs, the issues comprising changes in power flow and changes in characteristics;
wherein each of the plurality of IIMs comprises:
a master control module configured to:
receive the detected issues;
determine needed delays and needed number of synchronized injection waveforms to generate a pseudo-sinusoidal impedance waveform for impedance injection as a response to the detected issues;
identify the IIMs available for impedance injection, as resources; and
provide switching control signals to the identified IIMs for the impedance injection of the pseudo-sinusoidal impedance waveform into the HV transmission line in response to the detected issues; and
a local clock coupled to the master control module to respond to the switching control signals received from the master control module, wherein the local clock is to be synchronized with other local clocks in the identified IIMs to synchronize the impedance injection based on the switching control signals.

22. The system of claim 21, wherein the local clock is to be synchronized with a phase and frequency of current to synchronize the impedance injection.

23. The system of claim 21, wherein the local clock is to be synchronized to a master global clock or to a master clock at one of a local intelligence center or a supervisory utility.

24. The system of claim 21, wherein each of the plurality of IIMs further includes a high-speed communication interface configured for sub-cyclic communication with other IIMs among the plurality of IIMs within a local area and with at least one local intelligence center for communication and coordination of impedance injection, and to respond to any locally detected disturbances or imbalances on the HV transmission line for control of line current and line balancing within the local area, and each of the plurality of IIMs further enabled to respond interactively to instructions from a supervisory utility to meet target grid system objectives.

25. The system of claim 21, wherein each of the plurality of IIMs is connectable in series to the respective segment of the HV transmission line.

* * * * *